US011418632B2

(12) United States Patent
Bolotov et al.

(10) Patent No.: US 11,418,632 B2
(45) Date of Patent: Aug. 16, 2022

(54) HIGH SPEED FLEXIBLE PACKET CLASSIFICATION USING NETWORK PROCESSORS

(71) Applicant: Intel Corporation, Santa Clara, CA (US)

(72) Inventors: Anatoli A. Bolotov, San Jose, CA (US); Mikhail I. Grinchuk, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 585 days.

(21) Appl. No.: 14/969,834

(22) Filed: Dec. 15, 2015

(65) Prior Publication Data

US 2017/0171362 A1    Jun. 15, 2017

(51) Int. Cl.
*H04L 12/00*    (2006.01)
*H04L 69/22*    (2022.01)
*H04L 9/40*    (2022.01)

(52) U.S. Cl.
CPC .......... *H04L 69/22* (2013.01); *H04L 63/0245* (2013.01); *H04L 63/0263* (2013.01)

(58) Field of Classification Search
None
See application file for complete search history.

(56) References Cited

U.S. PATENT DOCUMENTS

| | | | | |
|---|---|---|---|---|
| 7,512,122 B1 * | 3/2009 | Olakangil | ............ | H04L 47/10 370/389 |
| 7,978,709 B1 * | 7/2011 | Venkatachary | ......... | H04L 45/00 370/395.32 |
| 3,040,798 A1 | 10/2011 | Chandra et al. | | |
| 9,058,343 B2 | 6/2015 | Cohen et al. | | |
| 9,269,439 B1 * | 2/2016 | Levy | ................ | G11C 15/00 |
| 2005/0226235 A1 * | 10/2005 | Kumar | ................ | H04L 29/06 370/386 |
| 2009/0190592 A1 * | 7/2009 | Hsieh | ................ | H04L 45/48 370/392 |

(Continued)

FOREIGN PATENT DOCUMENTS

| | | |
|---|---|---|
| EP | 2651095 A2 | 10/2013 |
| WO | 2015016807 A1 | 2/2015 |
| WO | 2017105700 A1 | 6/2017 |

OTHER PUBLICATIONS

D. E. Taylor, "Survey and Taxonomy of Packet Classification Techniques," ACM Computing Surveys, vol. 37, No. 3, Sep. 2005, pp. 238-275.

(Continued)

*Primary Examiner* — Noel R Beharry
*Assistant Examiner* — Lionel Preval
(74) *Attorney, Agent, or Firm* — Compass IP Law PC

(57) ABSTRACT

In one embodiment, a system comprises logic to receive a data packet. The logic is further to identify, based on the data packet, a plurality of candidate rules. The candidate rules may comprise a first candidate rule from a first database of rules and a second candidate rule from a second database of rules. The logic is further to select a rule from among the plurality of candidate rules based on a priority associated with the rule and a determination that the rule matches the data packet. The rule specifies at least one action to be performed on the data packet.

25 Claims, 19 Drawing Sheets

(56) References Cited

U.S. PATENT DOCUMENTS

| | | | | |
|---|---|---|---|---|
| 2010/0309917 A1* | 12/2010 | Zhang | .................... | H04L 45/00 |
| | | | | 370/392 |
| 2014/0006706 A1* | 1/2014 | Wang | ................ | G06F 16/90339 |
| | | | | 711/108 |
| 2014/0122791 A1* | 5/2014 | Fingerhut | ............... | H04L 49/00 |
| | | | | 711/108 |
| 2015/0244842 A1* | 8/2015 | Laufer | .................... | H04L 69/22 |
| | | | | 370/392 |
| 2015/0358433 A1 | 12/2015 | Parthasarathy et al. | | |
| 2017/0126588 A1* | 5/2017 | Anand | .................... | H04L 49/70 |

OTHER PUBLICATIONS

He et al., "Toward Predictable Performance in Decision Tree Based Packet Classification Algorithms," 19th IEEE Workshop on Local & Metropolitan Area Networks (LANMAN), Apr. 2013, 6 pp.

Qi et al., "Packet Classification Algorithms: From Theory to Practice," IEEE INFOCOM 2009, pp. 648-656.

Sun et al., "A Hybrid Approach to CAM-Based Longest Prefix Matching for IP Route Lookup," Proceedings of IEEE Global Telecommunications Conference (GLOBECOM 2010), Dec. 2010, 5 pp.

Taylor et al., "ClassBench: A Packet Classification Benchmark," IEEE/ACM Transactions on Networking, vol. 15, No. 3, Jun. 2007, pp. 499-511.

Xu et al., "High-Throughput and Memory-Efficient Multimatch Packet Classification Based on Distributed and Pipelined Hash Tables," IEEE/ACM Transactions on Networking, vol. 22, No. 3, Jun. 2014, pp. 982-995.

International Search Report and Written Opinion issued in PCT Application No. PCT/US2016/061757 dated Mar. 13, 2017; 10 pages.

Chinese and English Translation of P.R. China State Intellectual Property Office First Office Action for Patent Application No. 201680074036.1, dated Aug. 30, 2021, 23 pages.

Second Chinese Office Action of P.R. China State Intellectual Property Office for Patent Application No. 201680074036.1, dated Dec. 17, 2021, 9 pages.

* cited by examiner

HIGH SPEED FLEXIBLE PACKET CLASSIFICATION USING NETWORK PROCESSORS

FIELD

The present disclosure relates in general to the field of network traffic processing, and more specifically, to high speed flexible packet classification using network processors.

BACKGROUND

A network processor may be used to process packet data in a network. The network processor may be programmable allowing it to implement customized processing. Network processors may be used in various networking equipment, such as routers, switches, firewalls, intrusion detection and prevention devices, network monitoring systems, and other types of equipment. In some implementations, a network processor may perform packet classification. Packet classification may include applying rules to packets to determine which flow they belong to and to decide what service they should receive.

Packet classification is usually one of the first packet processing steps performed by a network processor. It is used for further networking applications including network security and access control, deep packet inspection, cloud computing needs, multimedia and traffic accounting (e.g., it may be used in peer-to-peer applications like voice over IP (VoIP) or multimedia over IP, including streaming live audio/video (A/V) data or real-time interactive A/V data, videoconference instant messaging, online gaming), etc.

BRIEF DESCRIPTION OF THE DRAWINGS

Like reference numbers and designations in the various drawings indicate like elements.

DETAILED DESCRIPTION

Figure 1:
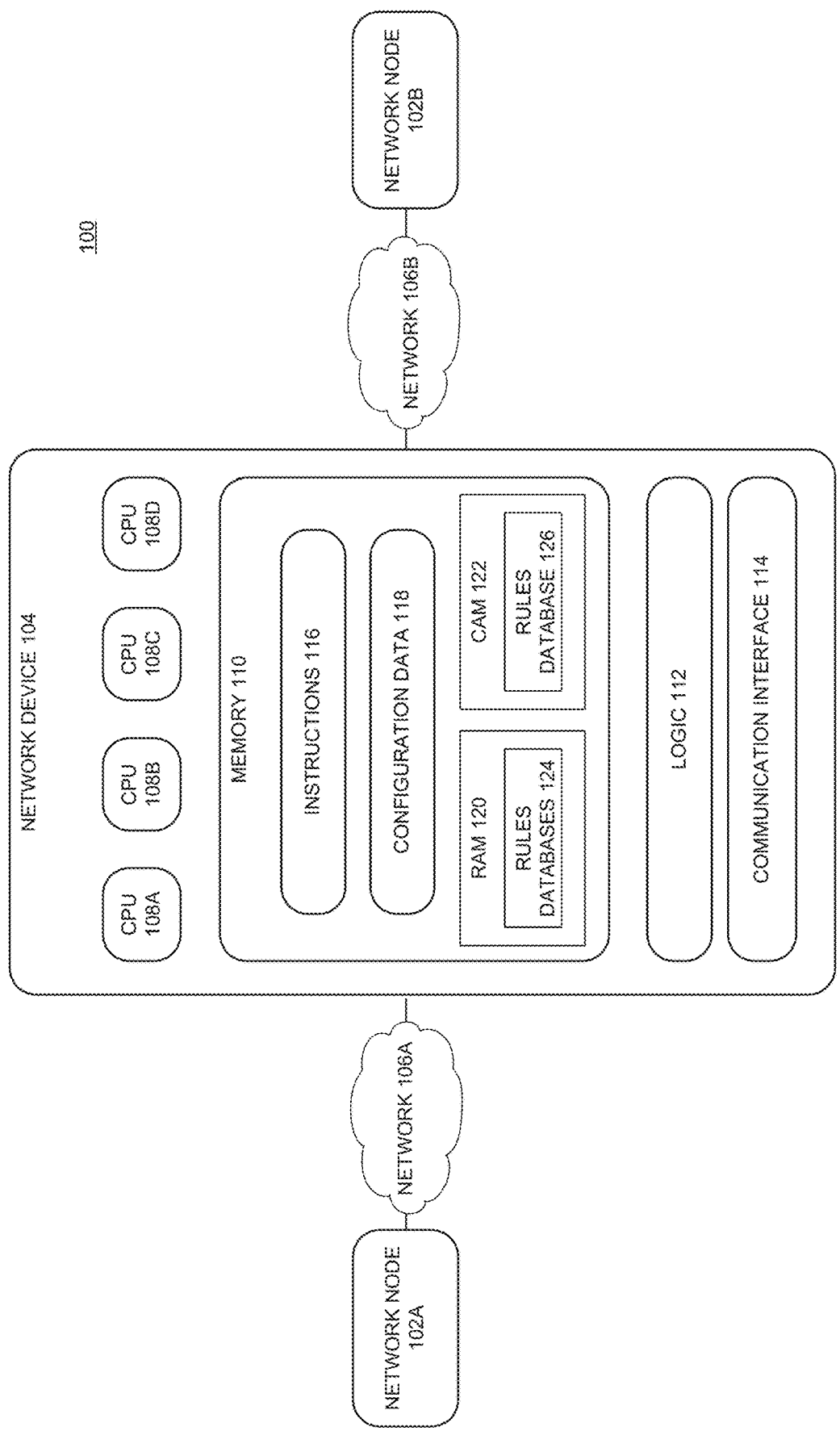
FIG. 1 illustrates a block diagram of components of a system for classifying packets in accordance with certain embodiments.

FIG. 1 illustrates a block diagram of components of a system 100 for classifying packets in accordance with certain embodiments. The system 100 includes network device 104 coupled to network nodes 102A and 102B via networks 106A and 106B. Network device 104 includes central processing units (CPUs) 108, memory 110, logic 112, and communication interface 114.

In various embodiments of the present disclosure, network device 104 may implement configurable high-performance packet classification methods. These methods may utilize fast intelligent search algorithms and flexible architectures to meet performance constraints imposed by modern high speed links and eliminate or mitigate drawbacks of widely used hardware based packet classification technology based on ternary content addressable memory (TCAM) or decomposition-based algorithms and software based packet classification technology, such as decision tree based algorithms, trie based algorithms, or other software-based techniques.

During packet classification, one or more header fields of an incoming packet are checked to find a match in a set of predefined rules (referred to as a rules/policy database, filter set, or classifier). Each rule may have the same preset number of fields with associated values, a priority to distinguish between multiple matches, and an action to be taken if the rule is matched and selected (based on priority or other search criteria). Different fields may require various types of matches, such as an exact match, a prefix match, a range match, or other suitable type of match. When the packet matches some rules, it will be processed further by the networking processor according to the action assigned to the highest-priority matching rule. In some embodiments, multi-match packet classification may be performed wherein all matching rules may be reported (as opposed to just the best matched rule).

Any suitable actions may be specified by the rules. For example, a rule may indicate that a packet should be denied (e.g., dropped), accepted (e.g., forwarded in a normal manner), redirected (e.g., forwarded to a particular port of the classifying apparatus or an associated apparatus), or that another suitable action should be performed on the packet (e.g., a packet field may be modified).

TABLE 1

| Rule IDs | IPv4 Source Address (SA) 32 bits | IPv4 Destination Address (DA) 32 bits | Source Port (SP) 16 bits | Destination Port (DP) 16 bits | Transport-layer Protocol 8 bits | Action |
|---|---|---|---|---|---|---|
| R1 | * | 152.163.80.1 | * | 80 | * | DENY |
| R2 | 152.163.*.* | 152.163.80.* | 0-1023 | 4242-4247 | UDP | ACCEPT |
| R3 | * | * | * | * | * | DENY |

As an example of packet classification, consider a 5-field packet classifier with a database of 3 rules (shown in Table 1) and an incoming packet with the following values of these 5 fields: (152.163.17.0, 152.163.80.0, 80, 4245, UDP). This packet would match rules R2 and R3. In the best match search setting (if rule R2 has higher priority than R3), the output of the search will be rule R2 with the corresponding action ACCEPT. That is, the packet will be accepted and processed by the network device 104.

A rules database may range in size (e.g., some rules databases may have over 100,000 rules) and the number of fields (a typical packet classifier may include between five and fifteen fields). A rules database may be used to implement various types of functions including, for example, an Access Control List (ACL); Firewall (FW), IP Chain (IPC), a filter for an Internet Service Provider (ISP) router and/or switch, etc. Rules databases may also support additional applications such as a Network Intrusion Detection Systems (NIDS), Virtual Private Networks (VPN), Network Address Translation (NAT) in firewalls and edge routers, and various other applications.

Various embodiments of the present disclosure include classification techniques in which a rules database is partitioned into multiple databases (e.g., tables) of rules which are searched independently to identify a single candidate rule or a limited number of candidate rules from each table (or an indication that no candidate rules were identified). Only the identified candidate rules are checked to determine which rule is the best match for the packet (i.e., matches the packet and has the highest priority of rules matching the packet). If a small portion of the rules database does not fit well into one of the tables, those rules may be processed separately (e.g., via a small CAM). Such embodiments may avoid both a sequential (step by step) chain of decisions required by tree-based classification schemes and the checking of a large number of rules as required by (T)CAM-based solutions.

Various embodiments may provide a wide array of technical advantages such as fast search operations with deterministic runtime, low latency design (e.g., for static random access memory (SRAM)-based solutions), fast compilation of rule databases, flexible and configurable architecture, support of different rule databases used in a single engine, power savings, easy scalability for ultra-high performance (e.g., low TCAM space requirements and low processing overhead), support of multi-match classification enabling various options associated with a search command (e.g., an option to find all matched rules instead of only the highest priority matched rule, or an option to perform a search in one or more portions of a rule database), run-time configuration of the length and number of fields in the rules (including range (port) fields), interleaved flow of search and editing (insert/delete) commands, and rules editing operations without interrupting search operations.

Network device 104 may include logic to perform any suitable networking function. For example, network device 104 may be a router, switch, firewall, intrusion detection and prevention device, session border controller, network monitoring system, and/or other suitable device operable to classify incoming packets. Network device may include one or more CPUs 108 to provide network device functionality.

A CPU 108 may comprise any processor or processing device, such as a microprocessor, an embedded processor, a digital signal processor (DSP), an application processor, a co-processor, a system on a chip (SOC), or other device to execute code. In a particular embodiment, CPU 108 is a network processor with a feature set geared towards networking applications. For example, a network processor may be a software programmable device with optimized capabilities (e.g., a specialized instruction set and/or customized architecture) for networking applications such as pattern matching, key lookup, data bitfield manipulation, queue management, and/or other functions.

CPU 108 may include any suitable number of processing elements (e.g., cores), which may include asymmetric processing elements or symmetric processing elements. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

CPUs 108 may each comprise any suitable number of processor cores. The cores may be coupled to each other, to memory 110, to logic 112, and/or to communication interface 114. In particular embodiments, a CPU 108 is embodied within a socket that is permanently or removeably coupled to network device 104.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, cores may include one or more out-of-order processor cores or one or more in-order processor cores. However, cores may be individually selected from any type of core, such as a native core, a software managed core, a core adapted to execute a native Instruction Set Architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

A core may include a decode module coupled to a fetch unit to decode fetched elements. Fetch logic, in one embodiment, includes individual sequencers associated with thread slots of cores. Usually a core is associated with a first ISA, which defines/specifies instructions executable on the core. Often machine code instructions that are part of the first ISA include a portion of the instruction (referred to as an opcode), which references/specifies an instruction or operation to be performed. The decode logic may include circuitry that recognizes these instructions from their opcodes and passes the decoded instructions on in the pipeline for processing as defined by the first ISA. For example, as decoders may, in one embodiment, include logic designed or adapted to recognize specific instructions, such as transactional instructions. As a result of the recognition by the decoders, the architecture of a core takes specific, predefined actions to perform tasks associated with the appropriate instruction. It is important to note that any of the tasks, blocks, operations, and methods described herein may be performed in response to a single or multiple instructions; some of which may be new or old instructions. Decoders of cores, in one embodiment, recognize the same ISA (or a subset thereof). Alternatively, in a heterogeneous core environment, a decoder of one or more cores may recognize a second ISA (either a subset of the first ISA or a distinct ISA).

In various embodiments, cores may also include one or more arithmetic logic units (ALUs), floating point units (FPUs), caches, instruction pipelines, interrupt handling hardware, registers, or other suitable hardware to facilitate the operations of the cores.

Memory 110 may comprise any form of volatile or non-volatile memory including, without limitation, magnetic media (e.g., one or more tape drives), optical media, random access memory (RAM), content addressable memory (CAM), read-only memory (ROM), flash memory, removable media, or any other suitable local or remote memory component or components. Memory 110 may be used for short, medium, and/or long term storage by platform 102. Memory 110 may store any suitable data or information utilized by network device 104, including software embedded in a computer readable medium, and/or encoded logic incorporated in hardware or otherwise stored (e.g., firmware). Memory 110 may store data that is used by cores of CPUs 108. In some embodiments, memory 110 may also comprise storage for instructions 116 that may be executed by the cores of CPUs 108 or other processing elements (e.g., logic 112) to provide functionality of the network device 104. Memory 110 may also store the results and/or intermediate results of the various calculations and determinations performed by CPUs 108 or logic 112. In the embodiment depicted, memory 110 may store configuration data 118 which may store any suitable data used to implement the embodiments described herein. For example, configuration data 118 may comprise attributes (e.g., size, type, etc.) of the available memory modules for use during compilation to determine how to partition the rules among the various rule databases.

In various embodiments, memory 110 may comprise one or more modules of system memory coupled to the CPUs through memory controllers (which may be external to or integrated with CPUs 108). In various embodiments, one or more particular modules of memory 110 may be dedicated to a particular CPU 108 or other processing device or may be shared across multiple CPUs 108 or other processing devices.

Memory 110 may comprise any suitable number of discrete memory modules (e.g., physical memory units each having their own set of electrical connectors to couple the memory module to other components of network device 104). In the embodiment depicted, memory 110 includes a plurality of RAM memory modules 120 that are configured to store a plurality of rules databases 124. Rules databases 124 may comprise rules and other data associated with the rules (e.g., any of the data described in the following embodiments, such as data for indexing functions, indexing tables, cage data, or other suitable data). Memory 110 also includes at least one CAM memory module 122 configured to store rules database 126 that includes rules not placed in rules databases 124.

Logic 112 may be used to perform any suitable steps disclosed in the flows and methods described herein. "Logic" (e.g., as found in logic 112 or in other references to logic in this application) may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on a printed circuit board), or other suitable hardware and/or software. Logic may include one or more gates or other circuit components. In some embodiments, logic may also be fully embodied as software.

Communication interface 114 may be used for the communication of signaling and/or data between network device 104 and one or more networks 106 and/or network nodes 102. For example, communication interface 114 may be used to send and receive network traffic such as data packets. In a particular embodiment, communication interface 114 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of network device 104 and another device coupled to network device 104 (e.g., network nodes 102).

The elements of network device 104 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the system 100 may be coupled together in any suitable, manner such as through one or more networks 106. A network 106 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can comprise any number of hardware or software elements coupled to (and in communication with) each other through a communications medium.

Network nodes 102 may be any suitable computing devices operable to send and receive network traffic (e.g., data packets). In various embodiments, a "computing device" may be or comprise, a computer, workstation, server, mainframe, embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, virtual machine, virtual appliance, or any other electronic, microelectronic, or microelectromechanical device for processing and communicating data. A client device may include an appropriate operating system, such as Microsoft Windows, Linux, Android, Mac OSX, Apple iOS, Unix, or similar operating system.

Figure 2:
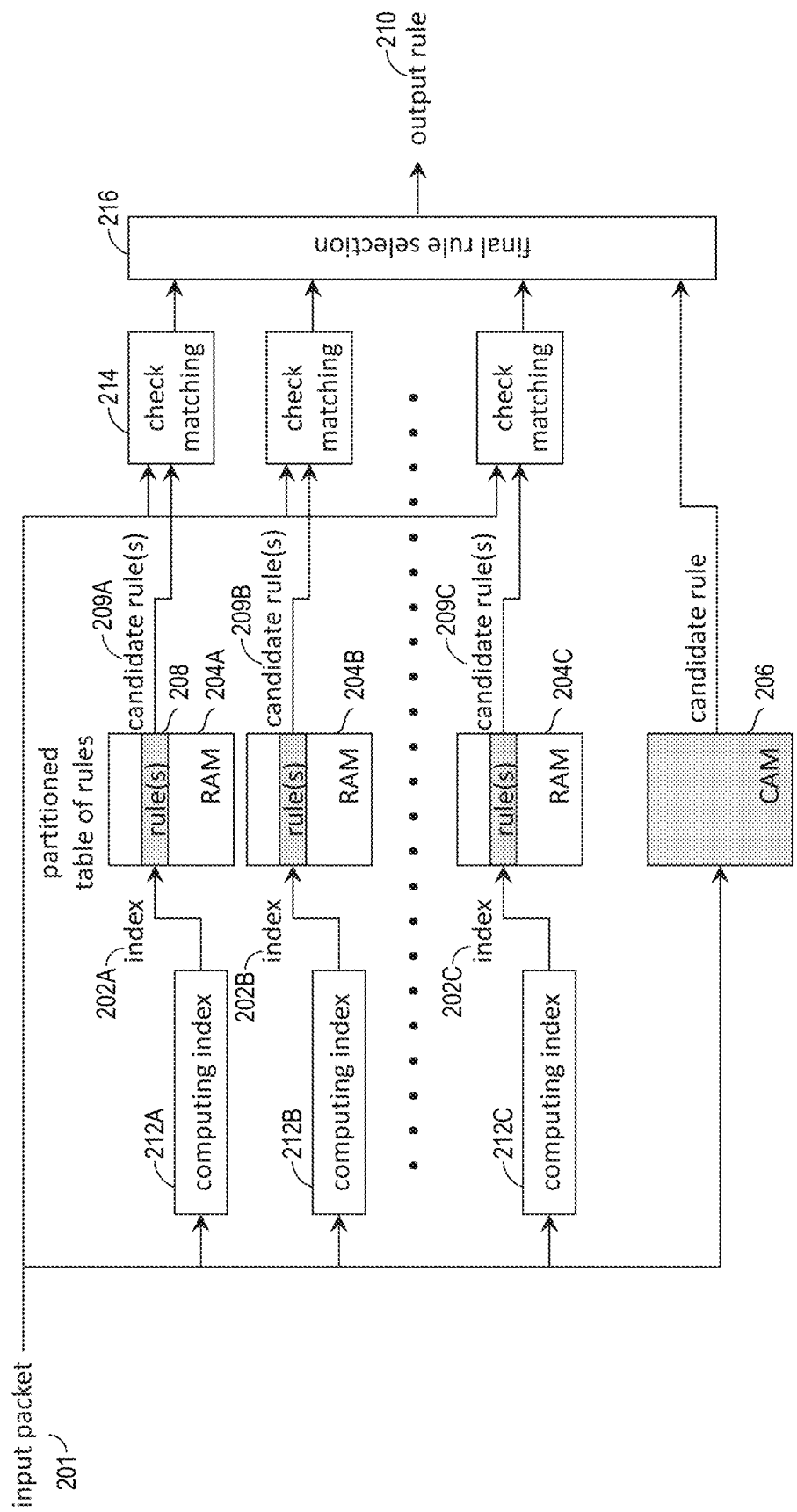
FIG. 2 illustrates a block diagram of a rule search that may be performed by the network device of FIG. 1 in accordance with certain embodiments.

FIG. 2 illustrates a block diagram 200 of a rule search that may be performed by network device 104 in accordance with certain embodiments. Various embodiments attempt to bring into reality the following imaginary "perfect" behavior of rule search: given an input packet 201, compute (without referring to large tables, trees, or other data containers) a preliminary decision (i.e., one or more candidate rules 209) of the form "if there exists a match, then it is rule number X", and then check just the candidate rules 209 to see whether they match the input packet 201. In other words, both sequential (step by step) chain of decisions of tree-based schemes and checking excessive numbers of rules in (T)CAM-based solutions is avoided. Various embodiments permit limited multi-variant computing in two places: (i) the database of rules is partitioned into several pieces (i.e., rule tables 204) that are searched independently (with the final selection among the partial search results, i.e., the candidate rules 209); (ii) a preliminary decision may return more than one candidate rule 209 (but still a small number of them). In some situations, a small portion of the database will not fit the scheme (or will require unacceptable multiplication of the above-mentioned variants) and therefore must be processed separately. For example, the rules 208 that are not placed into rule tables 204 may be placed in CAM 206 (which in some embodiments is a TCAM).

In the embodiment depicted, a database of rules is partitioned into a plurality of rule tables 204 that may each comprise any suitable number of rules. Each of these rule tables may be stored in a RAM, such as, for example, an SRAM or DRAM. In other embodiments, the rule tables may be stored in any suitable type of memory. Network device 104 may include any suitable number of discrete RAM modules. A RAM module may include one or more of the rule tables 204. Rules not placed in a rule table 204 are placed in CAM 206. The main part of the database and all auxiliary data structures (e.g., index tables or cage structures described below) may be stored in regular RAMs. In such embodiments, partial searches can be performed with a limited number of RAM accesses and can be organized in a pipelined manner, which enables very high throughput. The amount of required data processing and control logic is (for large databases) much smaller than the size of corresponding memories.

Partitioning of the set of database rules into rule tables 204 is performed during a software/firmware compilation and may be dynamically optimized to fit the given hardware restrictions (such as sizes of memories) and to improve secondary optimization parameters (such as better average/worst case performance, predictive reduction of power consumption etc.). During database compilation, the rules 208 are analyzed and rules that can be processed using RAM and comparing logic are placed into rule tables 204 while the remaining rules 208 are placed into a custom CAM 206. An optimization process may be run to minimize the number of rules to be directed to the CAM 206. This optimization is driven by the given rule database.

Each computing index block 212 may include logic to perform a mask-based indexing function on the input packet 201 in order to identify the candidate rule(s) 209 from a rule table 208. In an optimal rule table 204, the rule table is constructed such that given an input packet the computing index block 212 may compute one or more indices pointing to a very small number (e.g., not more than two) of candidate rules 209. The candidate rules 209 are then read from RAM and the corresponding check matching block 214 (which may include logic to check the rule(s) 209 against the input packet 201) performs match testing.

The computing index block 212 may utilize a mask, a sequence of bits of the same length as the rules 208 and input packets 201. The candidate rule 209 must fit the mask, (that is, all "don't care" bits of the rule must be masked out) and to the extent possible, the masking should maximally preserve distinction between rules. That is, large clusters of rules should not become identical after masking. The use and identification of appropriate masks will be described in more detail below.

There are two main classes of objects: packets and rules. A relationship between packets and rules may be expressed as follows: "a packet P matches (or doesn't match) a rule R" (the notion "to match" is used in a symmetric way, i.e. expressions "packet P matches rule R" and "rule R matches packet P" are considered as fully interchangeable synonyms).

A collection of rules is called a database. A database may refer to the aggregate collection of rules or a subset of the aggregate collection of rules (e.g., a rule table 204 or CAM 206). A database is characterized by its size (the number of rules it contains) and format. The format specifies the structure of rules and packets. According to the format, each packet and each rule are split into pieces called fields. Each field is characterized by its length (a positive integer) and type. The length of packets and rules is defined as sum of lengths of all fields. There are two main types of fields: numerical fields and bit fields. Bit fields have, in order, several subtypes. In addition to fields, each rule has at least two extra attributes: priority and flow ID. Optionally, both packets and rules may have additional attributes.

A packet of length N is an N-bit sequence. A field of a packet is a chunk of this sequence (the above-mentioned format specifies details of the splitting, namely the number of fields, their lengths, and types). In this disclosure, elements of bit sequences are enumerated from the right to the left, starting from zero: P=(bN−1, bN−2, . . . , b1, b0), while the fields/chunks will be listed in their natural left-to-right order: P={field1, field2, field3, . . . }. In particular numerical examples herein, bit sequences may be written without parentheses and commas, for example, P=01101 instead of P=(0, 1, 1, 0, 1). For packets, the difference between bit fields and numerical fields is only in their interpretation, numerical fields additionally represent respective numerical values which are non-negative integers (a numerical field of length L represents a value between 0 and 2L−1). Thus, numerical field containing bit sequence 01000101 is equivalent to 8-bit integer 64+4+1=69 (decimal)=45 (hexadecimal), etc.

A rule R of length N may be expressed as a more abstract notion. For example, a rule may be expressed as a triple (<predicate, priority, flow ID>), where priority and flow ID are numbers (e.g., nonnegative integers from given ranges; smaller numbers indicating higher priorities), and predicate is a function which, given any packet P of length N, determines whether P matches R or not. Matching is defined in a field-wise manner, that is, packet P with fields {PF1, . . . , PFk} matches rule R with fields {RF1, . . . , RFk} if all its fields match, that is, if PFi matches RFi for all i=1 . . . k. Field matching may be defined differently for bit fields and numerical fields.

A rule's bit field of length L can be written as a sequence of L symbols "0", "1", or "x". For example, a rule of length 4 might be written x01x. This rule matches to a packet's L-bit field if all L symbols match corresponding L bits in the packet's field (symbols "0" and "1" match bits 0 and 1 respectively, and symbol "x" matches any bit). That is, a rule's bit field "x01x" matches the following four bit fields of a packet: 0010, 0011, 1010 and 1011. There are two important subclasses of bit fields. An exact match field is a field that contains only symbols "0" and "1" (i.e., no "x"), or is completely undefined (contains only "x" symbols). A prefix field is a field that contains one or more symbols "x" (if any) only at rightmost positions, for example "0110xxx". The number of non-"x" symbols is called the length of the prefix, thus "0110xxx" has length=7 and prefix length=4. An exact match field may be considered a subclass of a prefix field.

A rule's numerical field (also known as a range) of length L is a pair of integers LB (lower bound) and UB (upper bound), where 0≤LB≤UB<2L. Numerical fields are usually written with separator ":" as LB:UB.

Rules can be encoded in different ways. Priority and flow IDs are numbers and therefore can be naturally represented by binary sequences of a length sufficient to express their maximum values. In one embodiment, a predicate may include 2N bits for a rule of length N, organized into two N-bit vectors. For example, a rule's bit field of length L can be encoded as an L-bit content and L-bit mask:

| symbol | content | mask |
|--------|---------|------|
| "0"    | 0       | 1    |
| "1"    | 1       | 1    |
| "x"    | 0       | 0    |

For example, a bit field of length 4 representing "x01x" can be encoded as content 0010 and mask 0110. A numerical field of length L can be encoded as two L-bit binary numbers, where the first number represents its lower bound, and the second number represents its upper bound. For example, consider a field of length 5 representing 3:8. This field maps into 5-bit numbers 3 and 8 or respective binary sequences 00011 and 01000. Of course, in other embodiments, the rules may be organized and/or encoded in any suitable manner. As one example, an exact match field has only two possible masks, 00 . . . 0 and 11 . . . 1, thus its mask can be encoded with 1 bit. As another example, prefix fields may be encoded using the length of the mask, that is, the number of non-"x" symbols, instead of the mask itself.

As a clarifying example, suppose that a format specifies 5 fields: a first prefix field of length 8, a second prefix field of length 8, a first numerical field of length 6, a second numerical field of length 6, and a bit field of length 4. Accordingly, the length of a packet or rule conforming to this format is 8+8+6+6+4=32. Suppose a rule R has the fields {"11010xxx", "011xxxxx", 13:43, 10:10, "x0x1"} and a packet P has the value 11010011_01111101_ 010000_001010_1001 (the underscores in the packet are included merely to enhance readability by indicating boundaries of fields). Packet P matches rule R, because 11010011 matches "11010xxx", 01111101 matches "011xxxxx", 010000 (decimal 16) matches 13:43, 001010 (decimal 10) matches 10:10, and 1001 matches "x0x1". The predicate of the rule R may be encoded as the following pair of 32-bit sequences (again underscores are added just for readability):
11010000_0110000_001101_001010_0001 and
11111000_1110000_101011_001010_0101

In this example, the first sequence includes contents of bit fields and lower bounds of numerical fields, and the second sequence consists of masks of bit fields and upper bounds of numerical fields.

The object of packet classification that may be performed by various systems of the present disclosure is as follows: given a database of rules and a packet (of the same format as the database), find the rule that matches the packet. If there is no such rule, report that no matching rule was found. If there are multiple rules matching the packet, choose the rule with the highest priority (herein higher priorities are represented as those of smaller numerical values with priority=0 representing the highest possible priority). If there is more than one matching rule of the highest priority, it may be determined that the database is misconfigured and the result of the classification is undefined.

Various embodiments may additional or other features, such as: outputting only the matching rule's flow ID and/or priority and not the rule itself (or information that identifies the rule, such as the address of memory where the rule is stored or the like); finding all matching rules; if multiple matching rules exist, outputting the number of matching rules; performing a search only among the rules with priorities with given range (for example, ignore rules with priorities higher than a given threshold).

Various embodiments of the present disclosure may perform the following objective: given a database, identify as large as possible its subset S (which may be placed into a rule table 204A) such that the classification problem restricted to this subset S can always be solved by a fast straight-line (i.e. loop-free) algorithm $A_1(S)$ (which may be performed by computing index 212A). This algorithm solves the classification problem if the answer R of the problem belongs to S, otherwise it may either explicitly fail (i.e., report that no matching rule was found), or find a different rule R' with lower priority than R. Among the rest of the database, identify as large as possible its subset (which may be placed into rule table 204B) such that the classification problem restricted to this subset can always be solved by a fast straight-line algorithm $A_2$ (which may be performed by computing index 212B), and so on, until the entire database is placed in a rule table 204 or until the given maximum number of steps is reached (whichever occurs first). If there are remaining rules in the database, they may be placed in CAM 206 and a CAM-based method may be used for them (e.g., this may be the last algorithm in the sequence). Thus, an indexing function is not used to search the CAM for the best rule. In such embodiments, algorithms $A_i$ should be flexible and configurable to meet the requirements of various databases.

Figure 3:
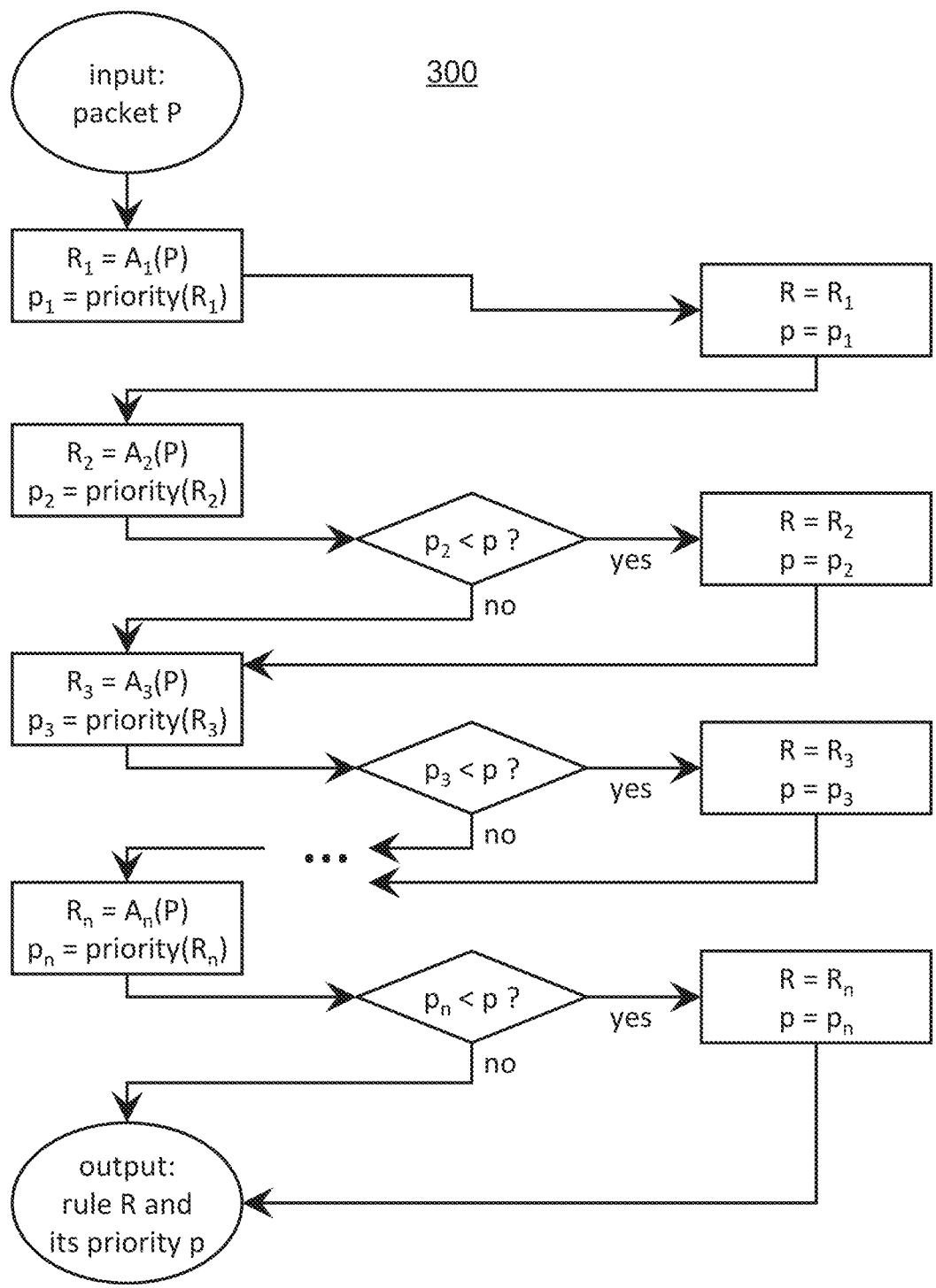
FIG. 3 illustrates an example flowchart for selecting a rule using serial operations in accordance with certain embodiments.
Figure 4:
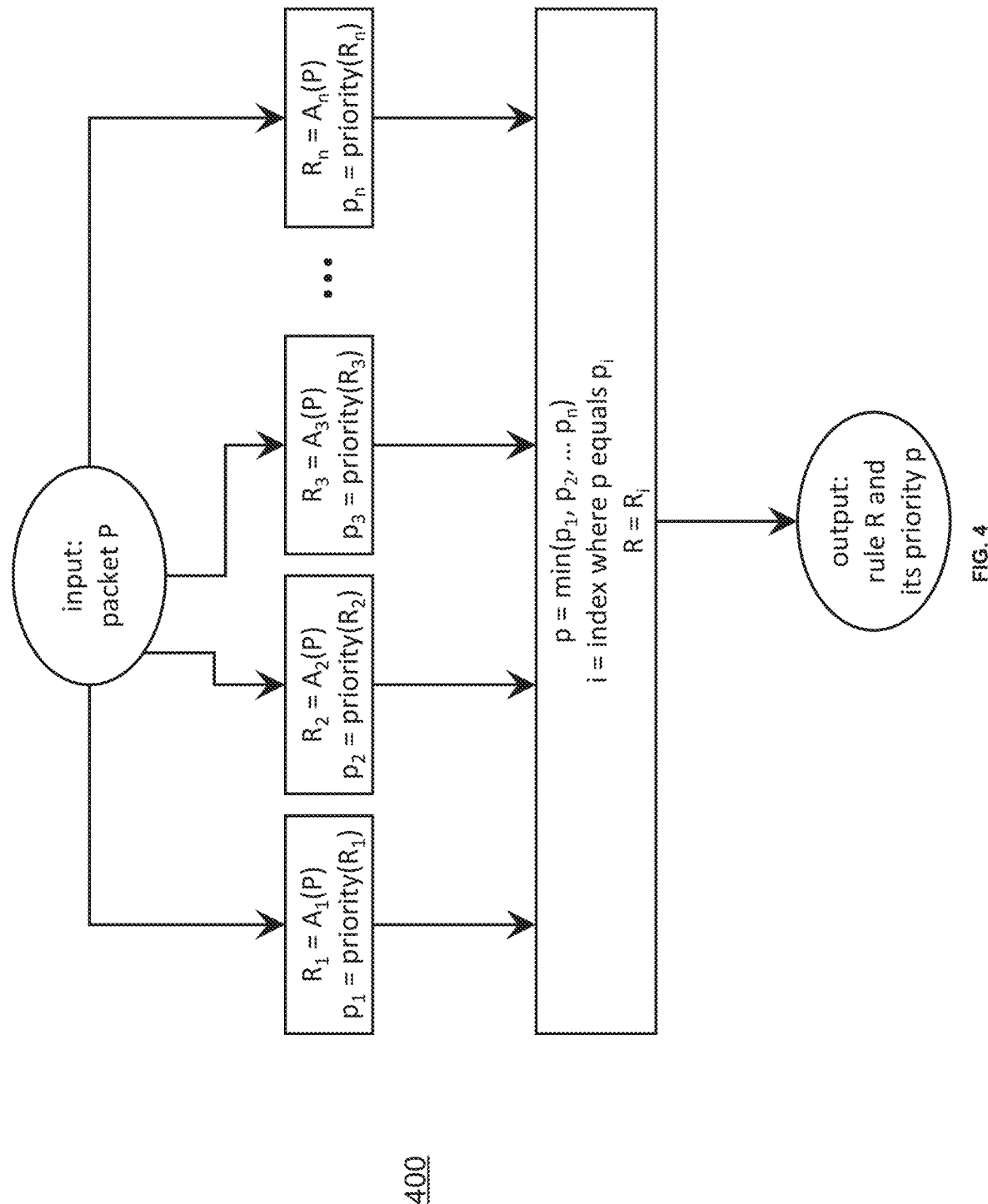
FIG. 4 illustrates an example flowchart for selecting a rule using parallel operations in accordance with certain embodiments.
Figure 5:
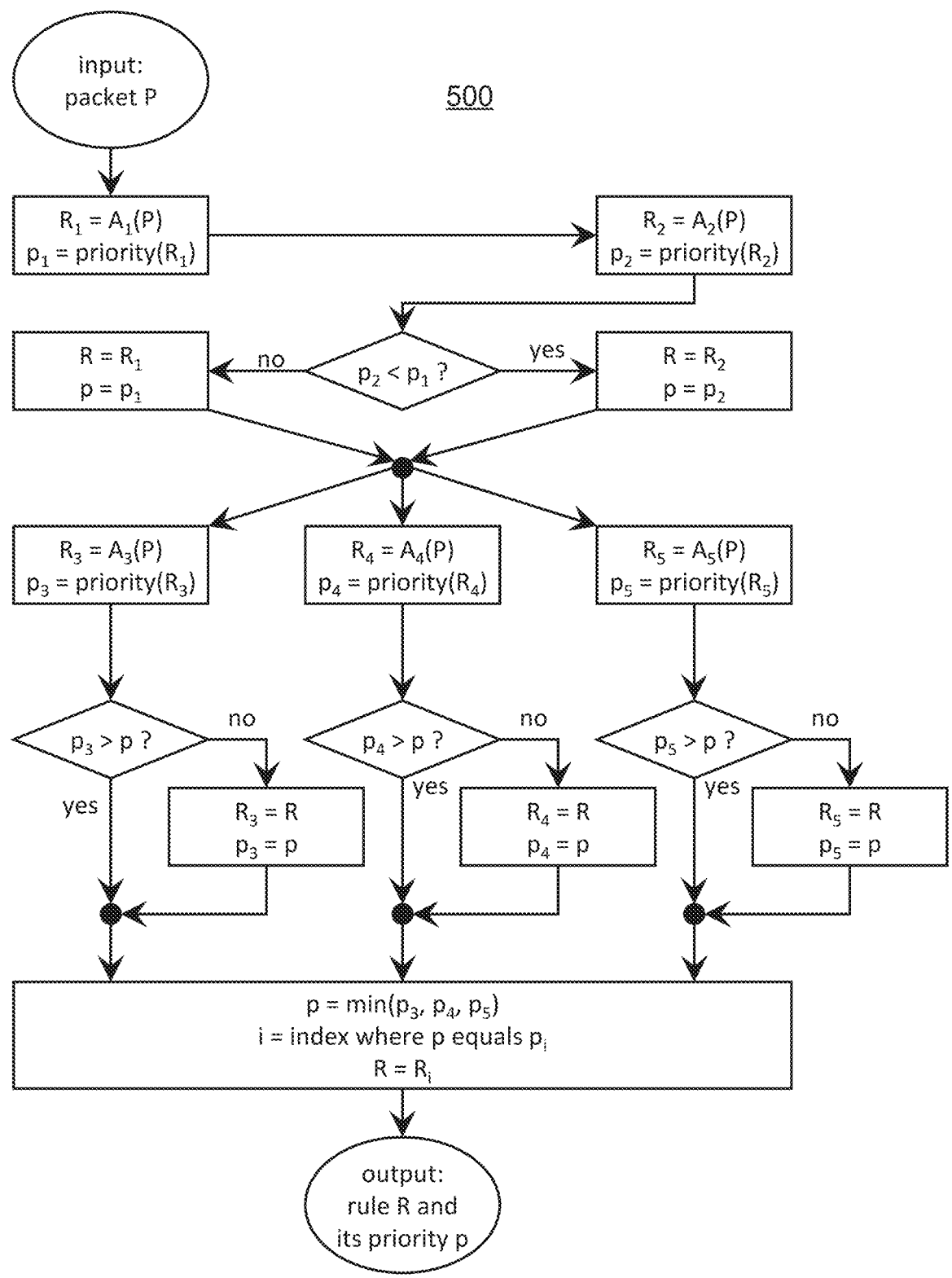
FIG. 5 illustrates an example flowchart for selecting a rule using serial and parallel operations in accordance with certain embodiments.

FIG. 3 illustrates an example flowchart 300 for selecting a rule using serial operations in accordance with certain embodiments. The flowchart 300 represents a chained (i.e., sequential) organization of the set of algorithms $A_1 \ldots A_n$. FIG. 4 illustrates an example flowchart 400 for selecting a rule using parallel operations in accordance with certain embodiments. Flowchart 400 represents an alternative (parallel) organization of the same set of algorithms $A_1 \ldots A_n$. FIG. 5 illustrates an example flowchart 500 for selecting a rule using serial and parallel operations in accordance with certain embodiments. Thus, flowchart 500 represents a hybrid approach to implement the same set of algorithms $A_1 \ldots A_n$.

The aggregate algorithm represented by flowcharts 300, 400, and 500 solves the classification problem (i.e., it finds a highest priority rule R that matches given packet P) if at least one of partial algorithms $A_i$ finds R (of course, index i will be generally different for different packets). Note that algorithms $A_1 \ldots A_n$ may differ from one another (e.g., they may have different numerical parameters or utilize different classification algorithms such as different indexing functions). In these flowcharts, p=priority(R) is shorthand for:

```
if (rule R is defined and matches packet P) then
    p = priority of R
else
    p = +∞
(where "∞" can be implemented as a number that is larger than priority of any rule)
```

In various embodiments, algorithms $A_i$ (with the possible exception of the final algorithm $A_n$ which may be of a different nature such as a CAM-based algorithm) may comprise mask-based indexing algorithms. These algorithms are based on indexing functions. An indexing function F takes a packet P as an argument and computes an integer result (i.e., an index) from a predefined range. Thus, index=F(P). If an indexing function F produces the same index for all packets P matching some rule R, then it may be said that function F supports rule R (which may be denoted as index=F(R)), otherwise, it may be said that function F does not support rule R (in this case, F(R) will be treated as undefined). It is possible to construct many various indexing functions). A "good" indexing function should support as many rules as possible and should maximally distinguish the rules (i.e., it should reduce the number of collisions where different rules lead to the same index, especially multi-way collisions). Details of possible implementations of indexing functions will be described in more detail below.

Various embodiments of the present disclosure provide variants of using indexing functions in packet classification. These embodiments utilize one or more tables. Herein we assume that entries of a table with X entries are numbered from 0 to X−1, and that if an indexing function F is used to produce indices for such a table, then values of F are integers between 0 and X−1. In each embodiment discussed, the input is a packet P and the output is either a rule R or a failure report (represented, for example, by an "undefined rule"). Herein, "R is good" and "R is bad" may be used respectively for "R is a rule and R matches P" and "R is an undefined rule or R doesn't match P".

Figure 6:
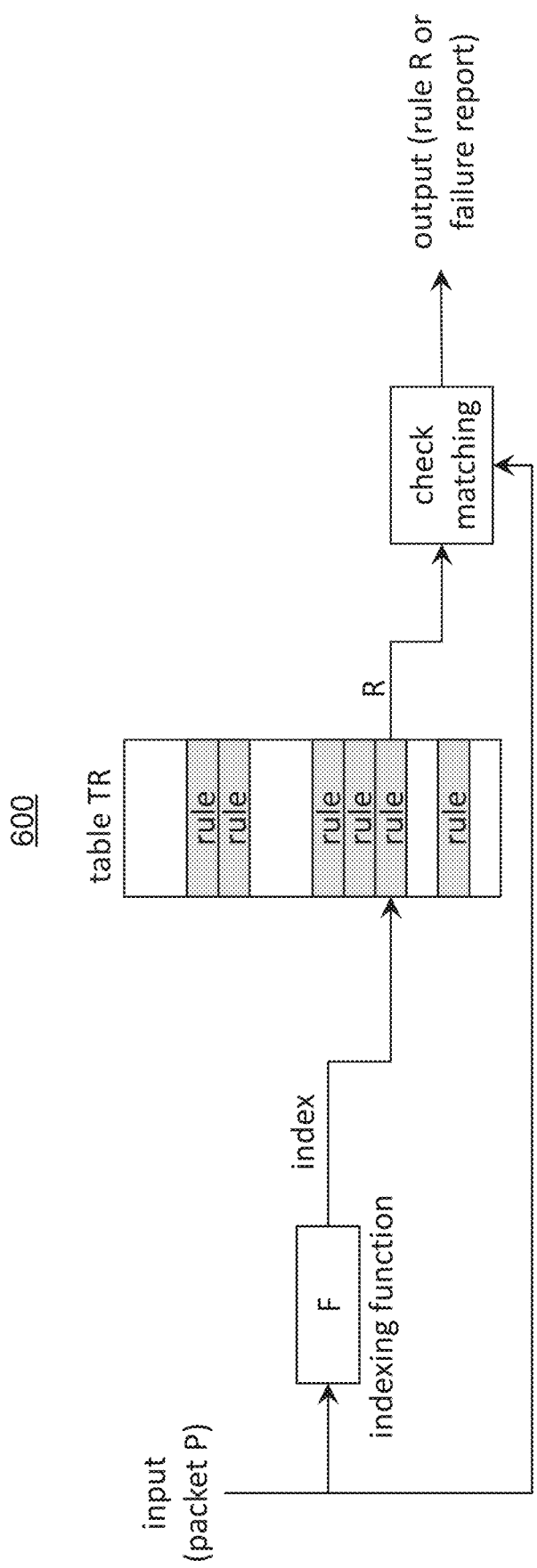
FIG. 6 illustrates an example flowchart for identifying a rule from a table using a single indexing function in accordance with certain embodiments.

FIG. 6 illustrates an example flowchart 600 for identifying a rule R from a table TR using a single indexing function F in accordance with certain embodiments. The indexing function F receives packet P as input and outputs an index. The table TR is accessed at a location identified by the index and the contents of that location (which may be a rule or an indication of an undefined rule) are retrieved. At the check matching block, the retrieved rule R is checked against the packet P and the rule is output if the rule matches the packet P. If the rule R does not match the packet P or if the entry of table TR accessed using the computed index did not include a rule, a failure report is returned.

Figure 7:
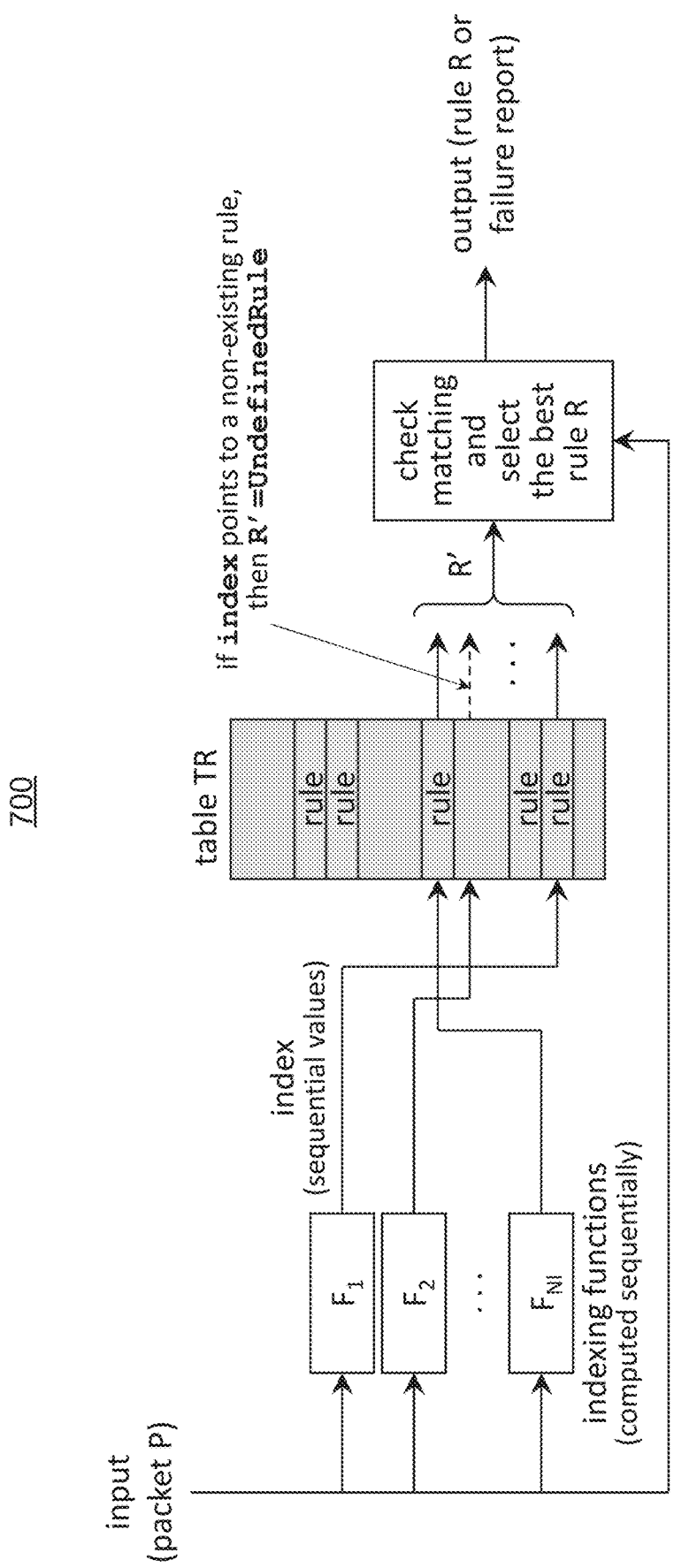
FIG. 7 illustrates an example flowchart for identifying a rule from a table using multiple indexing functions in accordance with certain embodiments.

FIG. 7 illustrates an example flowchart 700 for identifying a rule R' from a table TR using multiple indexing functions $F_1, F_2, \ldots F_{NI}$ in accordance with certain embodiments. The embodiment shown in flowchart 700 is a variant of the embodiment shown in flowchart 700. This embodiment utilizes a plurality of indexing functions that produce indexes that point to locations in the table TR. NI (Number of Indices) be an integer parameter greater than one and the functions $F_1 \ldots F_{NI}$ are distinct indexing functions. In one embodiment, the flow may be implemented in logic as follows:

```
R = UndefinedRule
repeat for i = 1...NI
{
    index = F₁(P)
    R' = TR[index]
    if(R' is good) then
        if(R is bad or priority(R) > priority(R')) then
            R = R'
}
return R
```

That is, a variable representing a rule R is initialized to a value that symbolizes an undefined rule. In each iteration, an indexing function receives the packet as input and calculates an index. The table TR is access at a location identified by the index and the contents of that location are retrieved. At the check matching block, the retrieved rule R' is checked against the packet P. If the rule R' is good (i.e., the rule wasn't undefined and the rule matches the packet P), then if the variable R is bad (e.g., is a value that symbolizes an undefined rule) or if the value of the priority of the rule R' is lower (meaning that it has higher priority) than the value of the priority of the rule R, then the rule R is set to the rule R'. The next iteration then begins. After all of the iterations, the rule R is output (which could be a valid rule or a value indicating an undefined rule which would indicate that no valid rules were found). This flow is still loop-free since all of the NI sections for individual indexing functions may be expanded into a straightline code. For example, in various flows herein that depict one or more repeat loops, a hardware unit (e.g., a processor or other logic) may perform all or a portion of an iteration of the repeat loop in parallel with other iterations being performed by other hardware units. Thus, in various embodiments, the flows may be implemented in a pipeline without requiring feedback.

Figure 8:
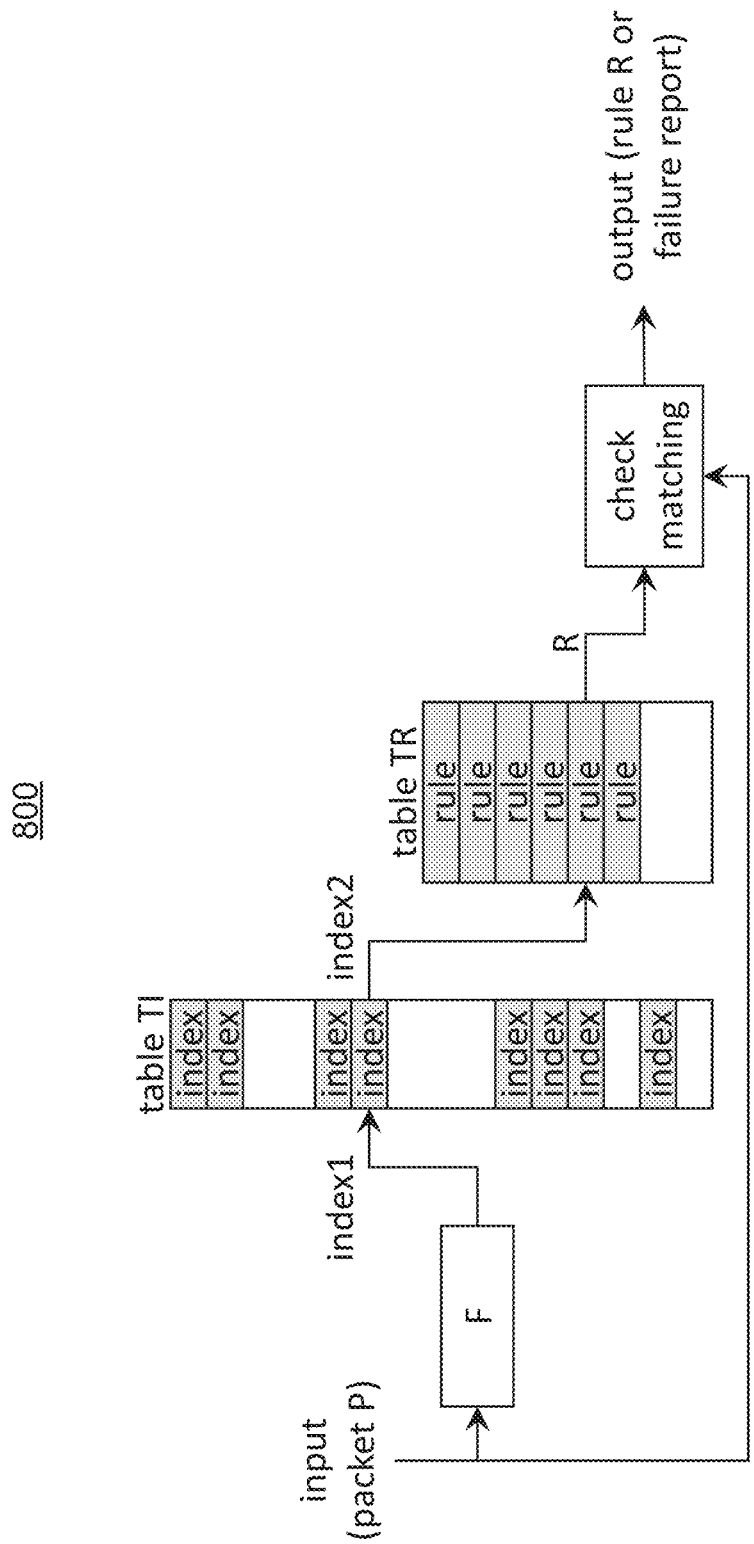
FIG. 8 illustrates an example flowchart for identifying a rule from a table using a single indexing function and a table of indices in accordance with certain embodiments.

FIG. 8 illustrates an example flowchart 800 for identifying a rule R from a table TR using a single indexing function F and a table of indices TI in accordance with certain embodiments. If the height of a table TR (e.g., that would be used with the flow of FIG. 6) is significantly larger than the number of valid rules stored in the table, then it becomes possible to save space (e.g., a smaller memory size may be used) by storing rules in a denser fashion and introducing an auxiliary table TI to map original indices into indices of this dense table. The auxiliary table may be expressed as TI[0: NTR−1] (Table of secondary Indices) where entries of this table are integers between 0 and NTR (with the value of NTR representing the "no such rule" case). Values from 0 to NTR−1 are valid secondary indices. Note that table TI may be much higher (i.e., have more total entries) than the new TR, but the entries of TI are very short (e.g., even for a database of a million rules, the entries of TI could be $\log_2 1000000 \approx 20$ bits long).

In one embodiment, the flow may be implemented in logic as follows:
  index1=F(P)
  index2=TI[index1]
  if(index2=NTR) then return UndefinedRule
  R=TR[index2]
  if(R is good) then return R
  return UndefinedRule In this flow, the indexing function F receives packet P as input and outputs an index index1. The table TI is accessed at a location identified by index1 and the contents of that location are retrieved. This value (index2) may be an index to the table TR or a value (e.g., NTR) indicating an invalid index. If index2 indicates an invalid index, then an indication that no valid rule was found is output. Otherwise, the table TR is accessed at a location identified by index2 and the contents of that location are retrieved. At the check matching block, the retrieved rule R is checked against the packet P and the rule is output if the rule matches the packet P. If the rule R does not match the packet P then an indication that no valid rule was found is output.

Figure 9:
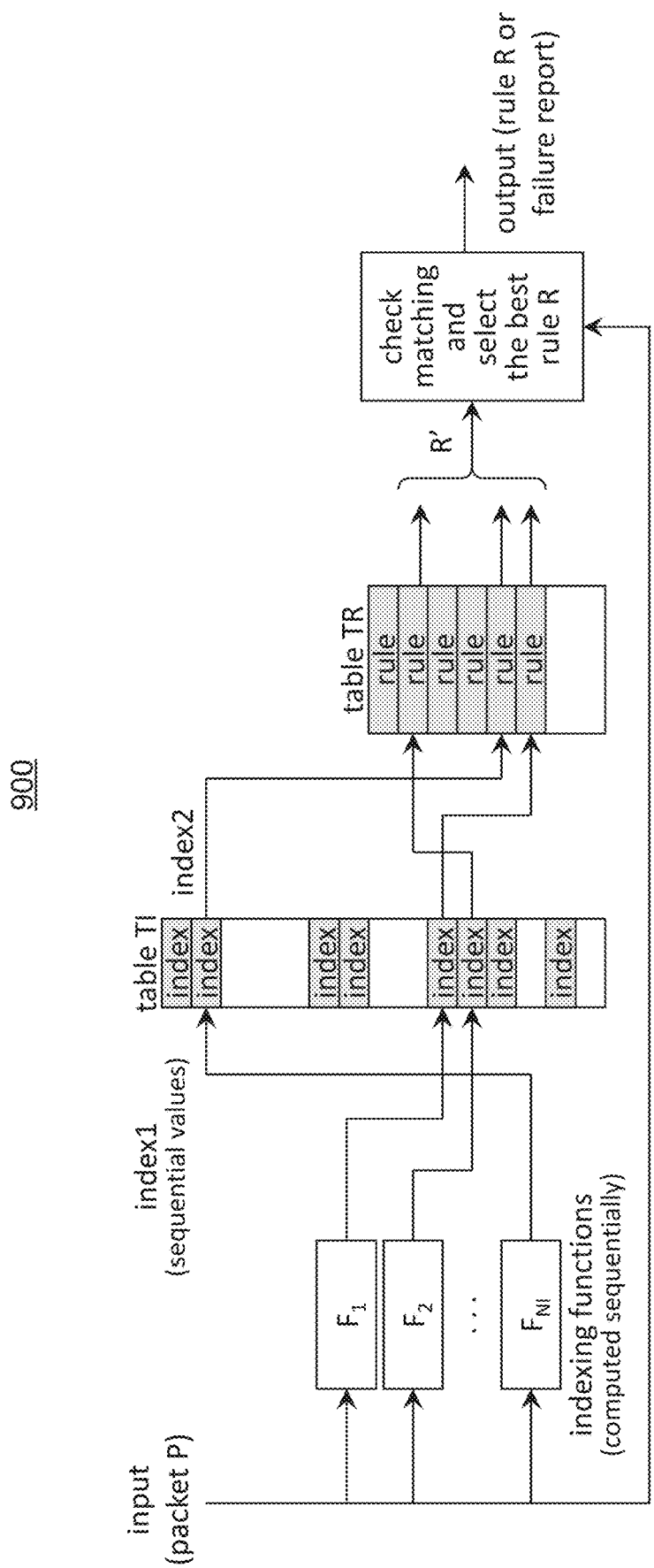
FIG. 9 illustrates an example flowchart for identifying a rule from a table using multiple indexing functions and a table of indices in accordance with certain embodiments.

FIG. 9 illustrates an example flowchart 900 for identifying a rule R from a table TR using multiple indexing functions $F_1, F_2, \ldots F_{NI}$ and a table of indices TI in accordance with certain embodiments. This flow generalizes the flow of FIG. 8 in the same way that the flow of FIG. 7 generalizes the flow of FIG. 6. The variable R will contain the best-so-far rule matching P (if any) and its value can be sequentially updated when a better rule (i.e., a matching rule with better priority) is found based on the output of a successive indexing function. Each input packet leads to NI accesses to table TI and up to NI accesses to table TR (if each access to table TI yields a valid index to table TR).

Figure 10:
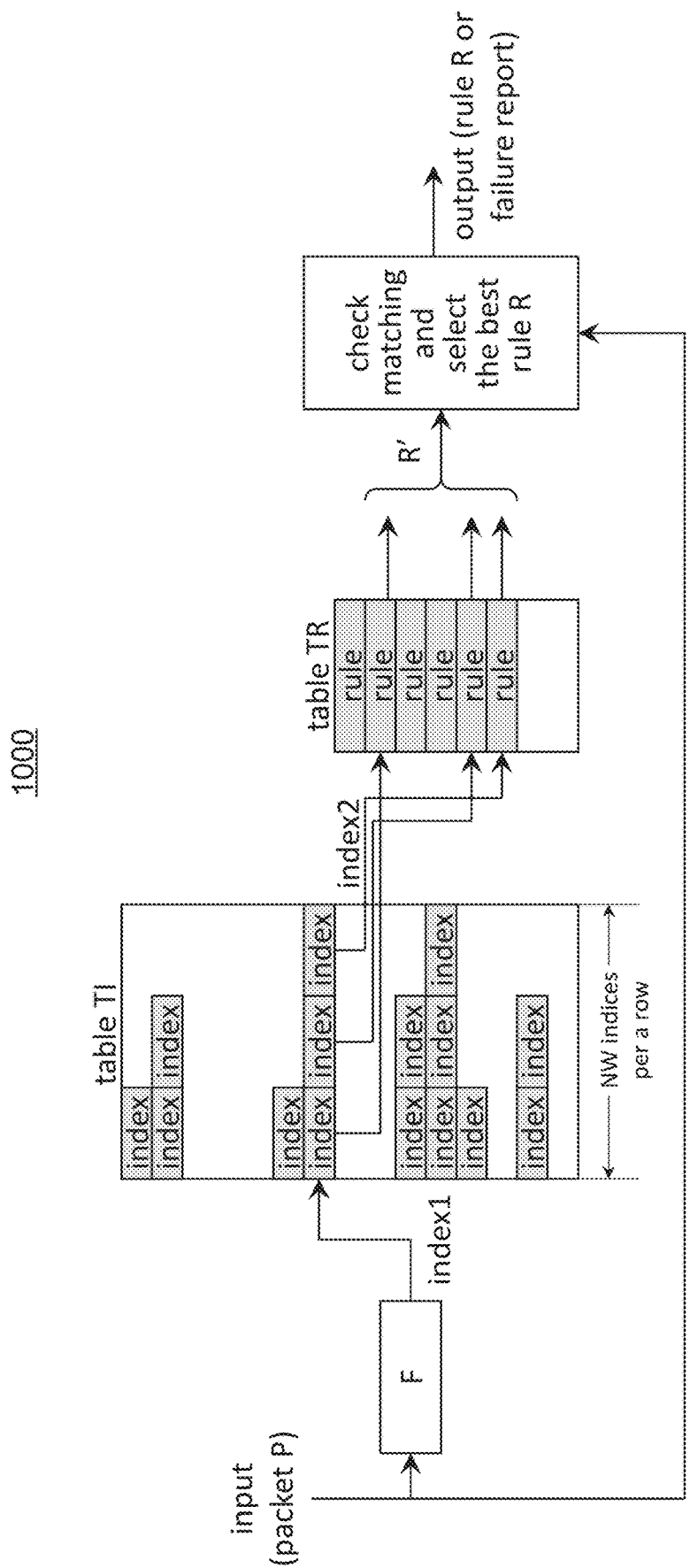
FIG. 10 illustrates an example flowchart for identifying a rule from a table using a single indexing function and a two dimensional table of indices in accordance with certain embodiments.

FIG. 10 illustrates an example flowchart 1000 for identifying a rule R from a table TR using a single indexing function F and a two dimensional table of indices TI in accordance with certain embodiments. In this embodiment, more than one rule may be indexed by the same index. For example, let NW (Number of Ways) acts as a condensation factor. NW is a positive integer parameter greater than one that limits the number of rules indexed by a single index. In such an example, each entry in TI includes an array of NW integers between 0 and NTR. Thus, the notation TI[i] may now represent the entire i-th array (i.e, a row of TI) and TI[i, j] refers to the j-th element of this array where j is a value between 0 and NI−1. For each array TI[i], the elements of the array may be arranged in such a way that values equal to NTR are placed after all other values. In one embodiment, the flow may be implemented in logic as follows:

```
R = UndefinedRule
index1 = F(P)
repeat for i = 0 ... NW-1
    {
        index2 = TI[index1, i]
        if(index2 = NTR) then exit from the loop
        R' = TR[index2]
        if(R' is good) then if(R is bad or priority(R) > priority(R')) then R = R'
    }
return R
```

In this flow, R is initialized to a value representing an undefined rule. The indexing function F receives packet P as input and outputs an index index1. The table TI is accessed at a location identified by index1 and an array of indices TI[index1] is retrieved. The first element TI[index1, 0] of the array is retrieved. If the retrieved element has a value of NTR, then the loop ends and R is output with a value that indicates that no matching rule was found. If the first element does not have a value of NTR, then the table TR is accessed at the value of the first element. If a rule R' matching the packet is obtained from the table TR and R is bad or the newly obtained rule R' has a better priority than R, then R is set to R'. These steps are repeated for each element of the array of TI[index1] until each element has been iterated through or until a value of NTR is retrieved from the array, at which point the value of R is output.

In some embodiments, all rules linked to from a row of TI may be placed in a contiguous region in table TR. Thus, the two dimensional table TI could be replaced by a one dimensional table of structures <number of indices, first index> assuming that each next index equals the previous index plus 1. This approach reduces the size of TI but makes it more difficult to insert/delete individual rules. A similar structure may be used in any of the other embodiments discussed herein.

A sparse index table TI may also be stored in a compressed form to reduce memory size. For example, let NW=2 and suppose that among each of four sequential rows (indexed 4k, 4k+1, 4k+2, 4k+3) there are no more than 3 valid indices. These 4 rows may be replaced with 3 indices by a single structure with three indices and a short "descriptor" specifying the distribution of these three indices between the four rows (in this example, the rows are called A, B, C, and D). In this particular example, 4-bit descriptors may be used as there are $2^4=16$ variants of the distribution, namely 4 variants with 3 indices from different rows (ABC, ABD, ACD, BCD) and 12 variants with two indices from one row and the third index from a different row (AAB, AAC, AAD; BBA, BBC, BBD; CCA, CCB, CCD; DDA, DDB, DDC). Variants with just two or less indices can be embedded into one of the shown 16 by using the out-of-range value NTR as dummy fillers. Thus, in this example the number of rows has been reduced by a factor of 4, with the disadvantage of a longer row length by a factor slightly larger than 1.5, resulting in a total compression of TI of about 40%. This methodology (with appropriate modifications) may be applied in any of the other embodiments discussed herein.

Figure 11:
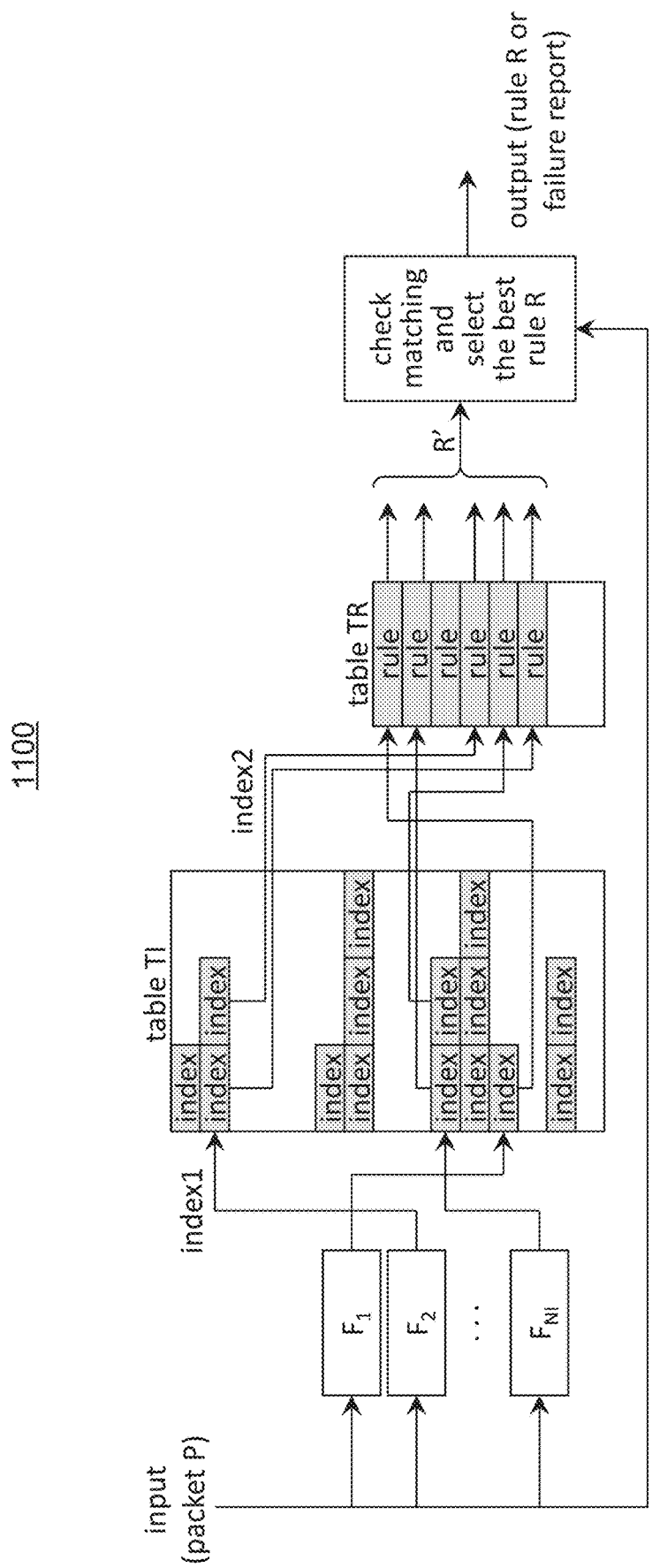
FIG. 11 illustrates an example flowchart for identifying a rule from a table using multiple indexing functions and a two dimensional table of indices in accordance with certain embodiments.

FIG. 11 illustrates an example flowchart 1100 for identifying a rule R from a table TR using multiple indexing functions $F_1, F_2, \ldots F_{NI}$ and a two dimensional table of indices TI in accordance with certain embodiments. This flow generalizes the flow depicted in FIG. 10. This embodiment operates in the same manner as the flow of FIG. 10, includes multiple indexing functions that may each produce an index that can point to multiple indices each pointing to rules to be checked. Each search request may include NI accesses to TI (assuming that the entire row of TI can be read as a united object) and up to NI×NW accesses to TR. In one embodiment, the flow may be implemented in logic as follows:

possible) predict cases of mismatch between the packet and one or more rules. If this prediction happens with respect to a particular index stored in TI, the reading of the corresponding rule from TR is skipped. Such embodiments may improve performance of the entire system when accessing the TR is a bottleneck on performance. Simple methods utilizing this idea include "extending" indexing functions to a length greater than $\log_2$ NTI bits and placing the extra bits in TI near the indices. The extra bits will be checked during a search and access to the TR will be skipped if they do not match the corresponding extra bits computed from the packet.

Figure 12:
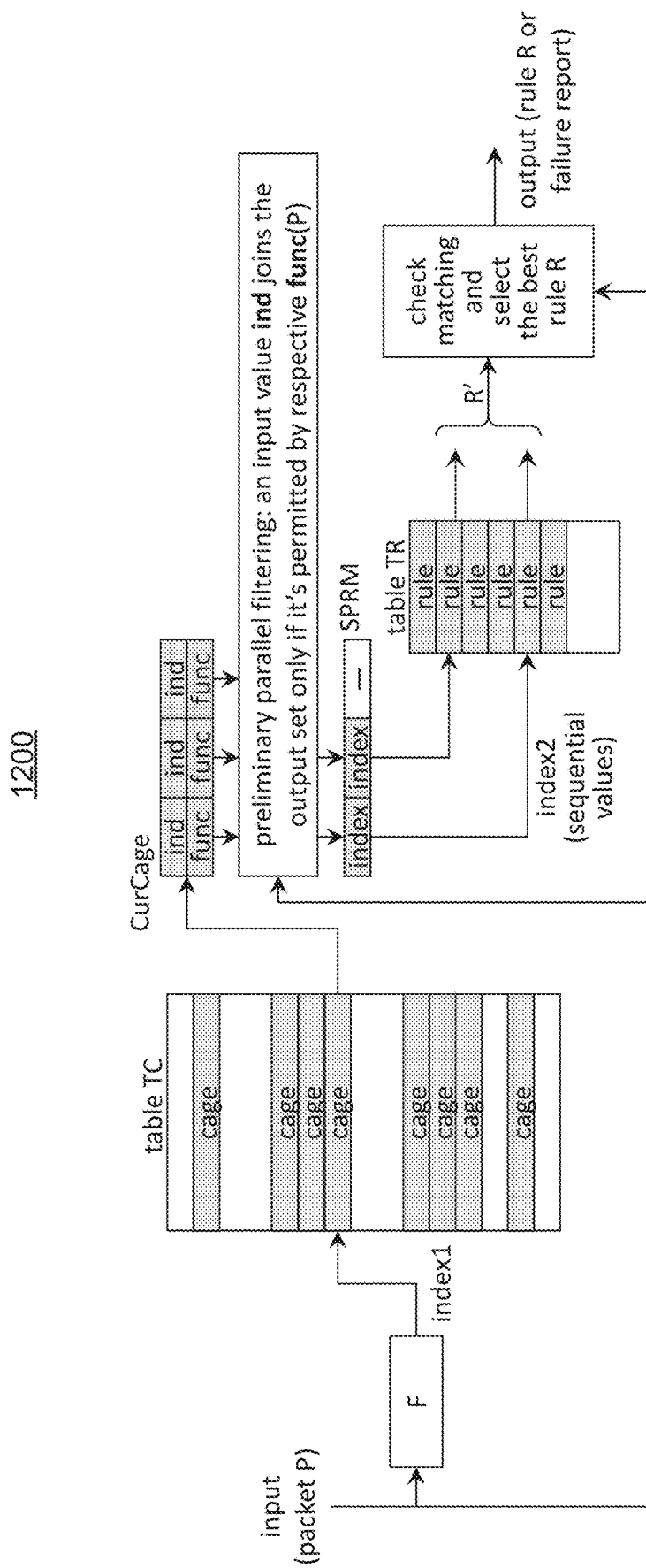
FIG. 12 illustrates an example flowchart for identifying a rule from a table using a single indexing function and preliminary filtering in accordance with certain embodiments.

FIG. 12 illustrates an example flowchart 1200 for identifying a rule R from a table TR using a single indexing function F and preliminary filtering in accordance with certain embodiments. This flow generalizes the flow shown in FIG. 10 in the following way: instead of a table of indices TI, a table of cages TC is used where each entry TC[i] (called a "cage") contains an array of NW elements TC[i, j], where each TC[i, j] is a pair <ind, func> (suffix notation X.ind and X.func will be used to refer to the components of the pair X), where, in order, "ind" is a number indexing to TR (thus TF[i, j].ind is similar to TI[i, j] of the flow of FIG. 10), and "func" describes a simple function (with a packet as input and a value indicating yes or no as output) which tries to predict violations of the condition "packet P matches rule TR[TC[i, j].ind]". More specifically, the possible values of the output of such a function may be interpreted as "can match" and "cannot match." In the "can match" case, the rule should be extracted from TR and checked because the rule may or may not match the packet, but in the "cannot match" case, it is known in advance that the rule doesn't match the packet and so the rule does not need to be read from TR. In various embodiments, an internal variable CurCage may be used that represents one cage of TC and an auxiliary set (array) SPRM of indices to "potentially matching" rules.

In one embodiment, the flow may be implemented in logic as follows:

```
R = UndefinedRule
repeat for i = 1...NI
    {
        index1= F₁(P)
        repeat for j = 0 ... NW-1
            {
                index2 = TI[index1, j]
                if(index2 = NTR) then exit from the inner loop
                R' = TR[index2]
                if(R' is good) then if(R is bad or priority(R) > priority(R')) then R = R'
            }
    }
return R
```

In various embodiments of the present disclosure, the TI table may include extra information that may (as often as

```
R = UndefinedRule
index1 = F(P)
SPMR = empty set
CurCage = TC[index1]
do in parallel for i = 0 ... NW-1
        if(CurCage[i].func(P) = "yes") then
            add value of CurCage[i].ind to the set SPRM
repeat for each element index2 from the set SPRM
    {
        R' = TR[index2]
        if(R' is good) then if(R is bad or priority(R) > priority(R')) then R = R'
```

```
        }
return R
```

In this example, the set of potential rule matches SPRM has no more than NW elements, thus the "repeat for each" loop in the flow above may still be unrolled (e.g., implemented in parallel in hardware). Moreover, in some embodiments SPRM may be constrained such that it will never contain more than NW' elements, where NW' is an integer parameter of the algorithm, and 0<NW'≤NW. Smaller values of NW' will guarantee faster execution of certain implementations of various embodiments discussed herein because they will limit the number of accesses to TR per search request, which may be a crucial factor for total performance.

The flow of FIG. 10 may be directly modeled by the flow of FIG. 12 in the following way: define NW'=NW, replace each TI's entry with value n<NTR by pair <n, $F_{yes}$>, and replace each TI's entry with value n=NTR by pair <0, $F_{no}$>, where $F_{yes}$ and $F_{no}$ are functions always returning "yes" and "no", respectively.

Figure 13:
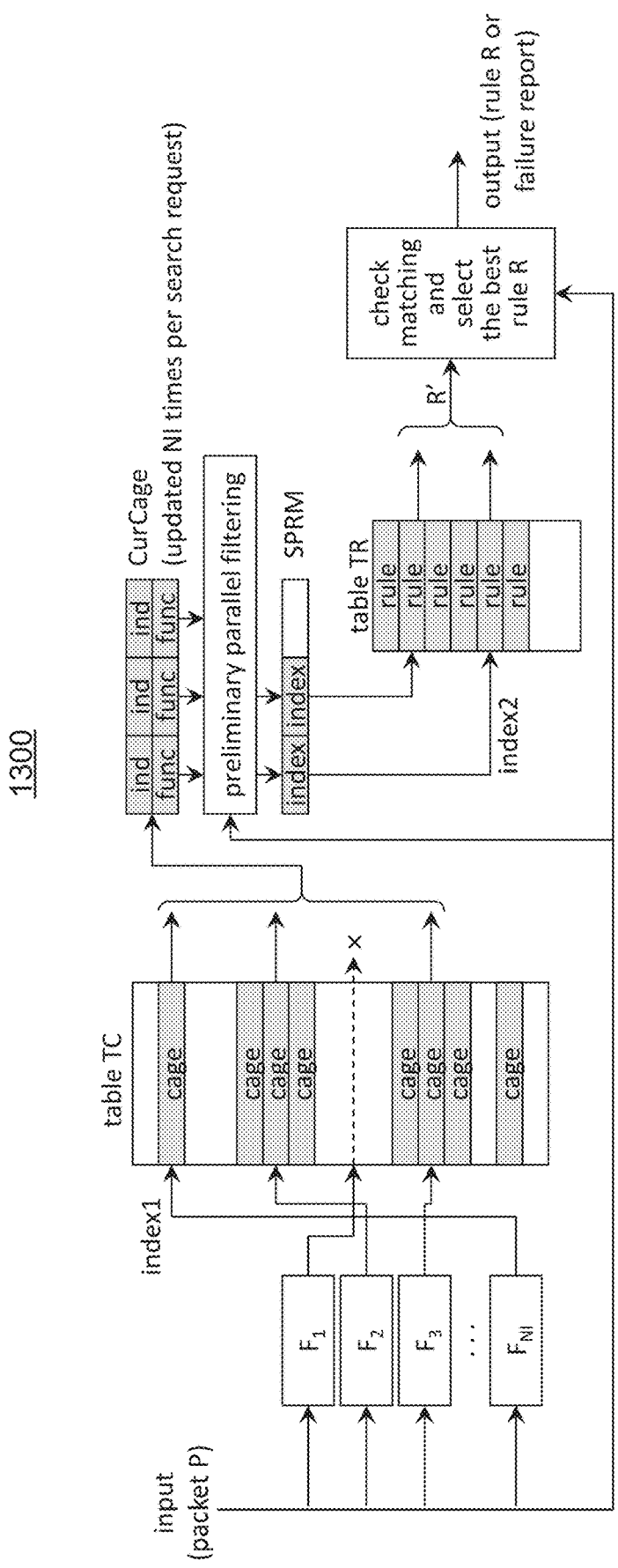
FIG. 13 illustrates an example flowchart for identifying a rule from a table using multiple indexing functions and preliminary filtering in accordance with certain embodiments.

FIG. 13 illustrates an example flowchart 1300 for identifying a rule R from a table TR using multiple indexing functions $F_1$, $F_2$, . . . $F_{NI}$ and preliminary filtering in accordance with certain embodiments. The flow is similar to the flow of FIG. 12 except multiple indexing functions are used to access entries of table TC. In one embodiment, the flow may be implemented in logic as follows:

the flow of FIG. 12, but the output of the function F is used to access a table of indices TI before a table of cages TC is accessed with the retrieved index index2. Such embodiments may allow the cages to be placed in the TC in a denser manner.

In one embodiment, the flow may be implemented in logic as follows (where NTC represents the number of entries of table TC):

```
R = UndefinedRule
repeat for i = 1...NI
        {
                index1 = F₁(P)
                SPMR = empty set
                CurCage = TC[index1]
                do in parallel for j = 0 ... NW-1
                        if(CurCage[j].func(P) = "Yes") then
                                add value of CurCage[j].ind to the set SPRM
                repeat for each element index2 from the set SPRM
                        {
                                R' = TR[index2]
                                if(R' is good) then
                                        if(R is bad or priority(R) > priority(R')) then
                                                R = R'
                        }
        }
return R
```

Figure 14:
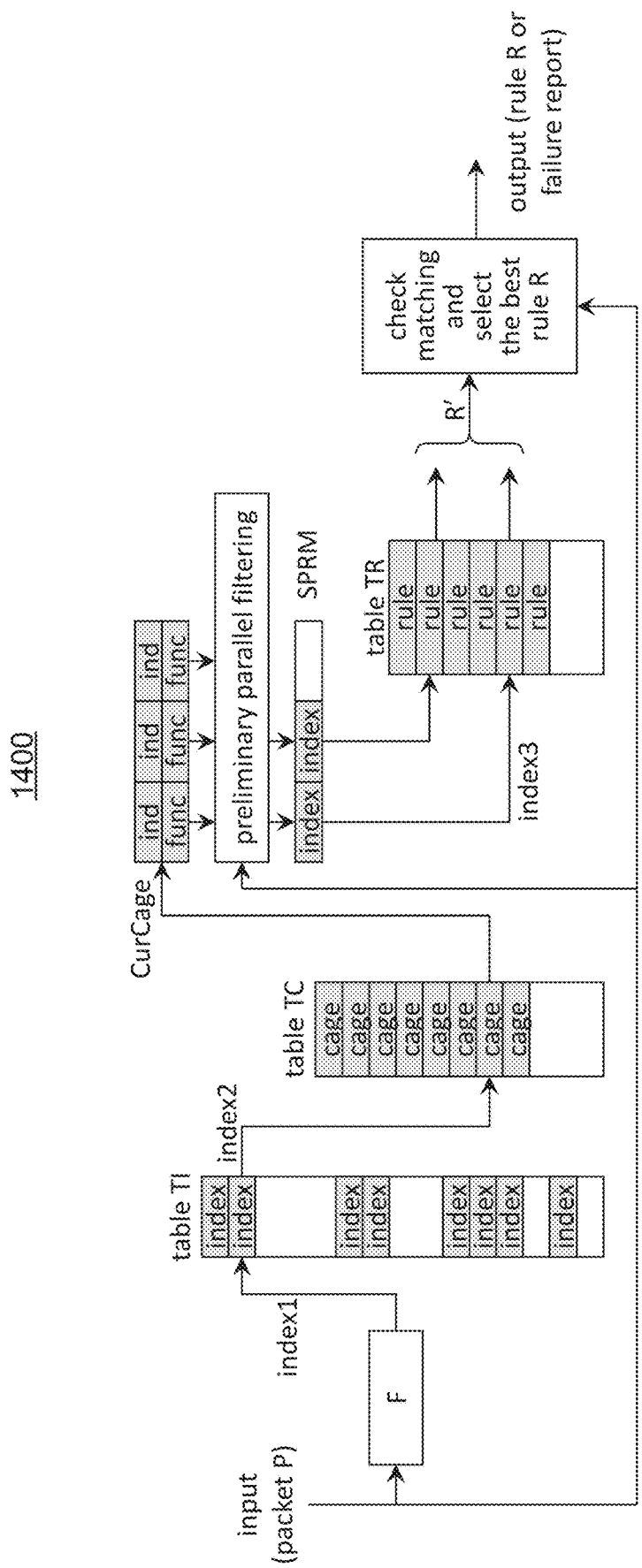
FIG. 14 illustrates an example flowchart for identifying a rule from a table using a single indexing function, a table of indices, and preliminary filtering in accordance with certain embodiments.

FIG. 14 illustrates an example flowchart 1400 for identifying a rule R from a table TR using a single indexing function F, a table of indices TI, and preliminary filtering in accordance with certain embodiments. This flow is similar to

```
R = UndefinedRule
index1 = F(P)
index2 = TI[index1]
if(index2 < NTC) then
        {
                SPMR = empty set
                CurCage = TC[index2]
                do in parallel for i = 0 ... NW-1
                        if(CurCage[i].func(P) = "yes") then
                                add value of CurCage[i].ind to the set SPRM
                repeat for each element index3 from the set SPRM
                        {
                                R' = TR[index3]
                                if(R' is good) then
```

```
                if(R is bad or priority(R) > priority(R')) then
                    R = R'
            }
    }
    return R
```

Figure 15:
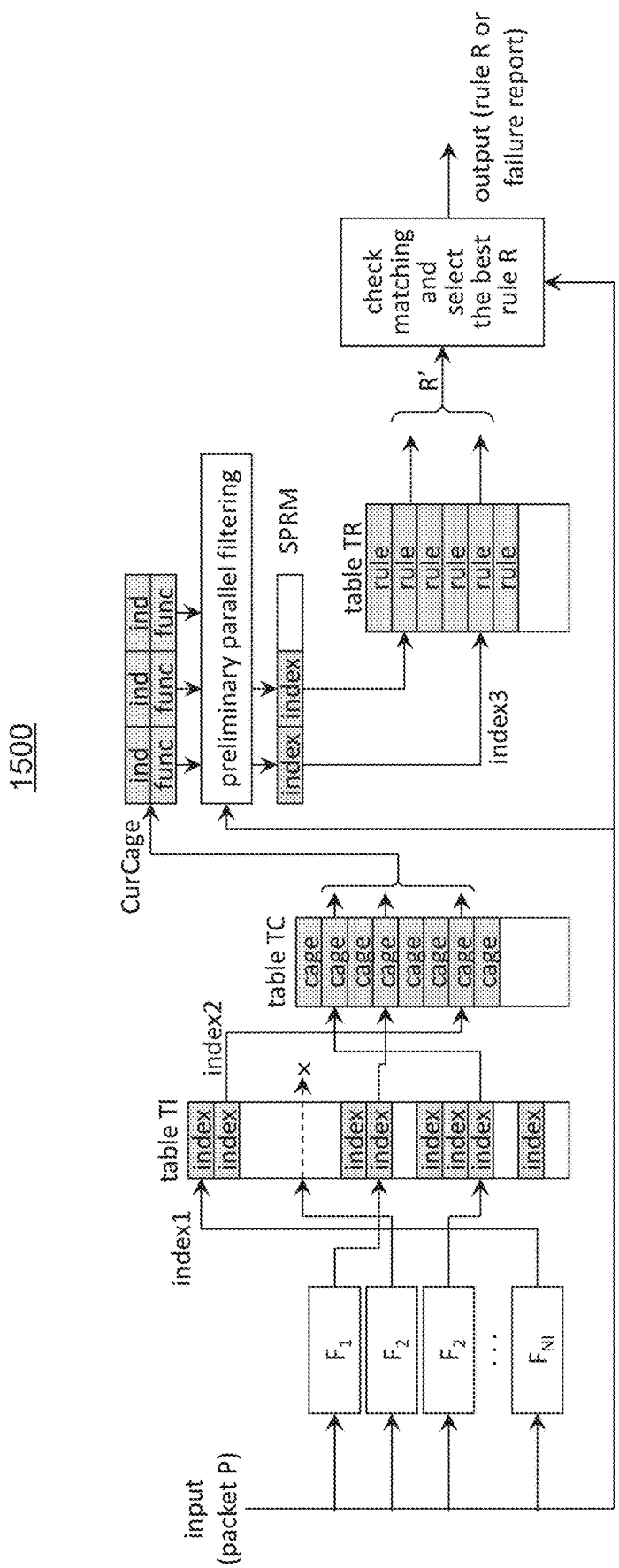
FIG. 15 illustrates an example flowchart for identifying a rule from a table using multiple indexing functions, a table of indices, and preliminary filtering in accordance with certain embodiments.

FIG. 15 illustrates an example flowchart 1500 for identifying a rule R from a table TR using multiple indexing functions $F_1, F_2, \ldots F_{NI}$, a table of indices TI, and preliminary filtering in accordance with certain embodiments. This flow is similar to the flow of FIG. 14, but utilizes multiple indexing functions to output indices that are used to retrieve cage indices from table TI. During a search request, there are NI accesses to TI, no more than NI accesses to TC (index1 may point to an unused element of TI), and no more than NI×NW' accesses to TR.

In one embodiment, the flow may be implemented in logic as follows:

```
R = UndefinedRule
repeat for i = 1...NI
    {
        index1 = F_i(P)
        index2 = TI[index1]
        if(index2 < NTC) then
            {
                SPMR = empty set
                CurCage = TC[index2]
                do in parallel for j = 0 ... NW-1
                    if(CurCage[j].func(P) = "yes") then
                        add value of CurCage[j].ind to the set SPRM
                repeat for each element index3 from the set SPRM
                    {
                        R' = TR[index3]
                        if(R' is good) then
                            if(R is bad or priority(R) > priority(R')) then
                                R = R'
                    }
            }
    }
return R
```

The cages used in the flows of FIGS. 12-15 are data structures that may contain up to NW links (indices/pointers) to the rules stored in TR and local filtering/decision information which allows, for each incoming packet P, to filter out up to all (but not more than NW') of the rules pointed to by the indices of the cage(s) selected by the indexing function(s). For example, a combination of parameters NW=2 and NW'=1 means that the cage can point to two rules but, given any packet P, we may eliminate one of them. This behavior may be implemented, for example, by a decision algorithm of the form "check i-th bit of P; if it is 0, choose the first rule, otherwise choose the second rule". As mentioned earlier, there is no guarantee that the chosen rule will match packet P; but there is a guarantee that a rule that is not chosen does not match the packet P. Not all pairs of rules can be distinguished in such a way (for example, the decision algorithm may pass both rules; or distinguishing between the rules may require inspecting more than one bit). Prevention of such unwanted cases may be accomplished during database compilation.

Formally, a cage may be considered as an array of NW elements, where each element is a pair <ind, func>. But in particular implementations this information can be written in a different form. A more compact form may be preferred, even if this results in restrictions being placed on the class of supported functions and/or on the rule allocation strategies in the TR.

As an example, all rules related to a particular cage may be stored in a contiguous region of TR. In this case, instead of up to NW indices of particular rules, only one index (the index of the first rule) and the number of rules (an integer of range 0 . . . NW) needs to be stored in the cage.

In some embodiments, all functions func in one cage depend on the same (e.g., very small) number of bits of a packet. In this case, a description of their positions within a packet can be shared by all NW cage's elements, as is done in the following embodiment (see LBIA below). In one example, the cage may be a data structure containing:

local bit index array LBIA containing B integers of range 0 . . . L−1 (B is a small integer parameter, (e.g., B=4), and L is the length of the packets);

local table LTT (which in some embodiments may be implemented in TCAM) with NW rows and B columns; entries are "0", "1", and "x";

local table of indices LTI containing NW indices (integers of range 0 . . . NTR−1 pointing to the rules in TR).

Given a packet P, this data structure may be used (e.g., the following actions may be performed in the "do in parallel" loop of the flows of FIGS. 12-15) as follows:

extract bits P[LBIA[0]] . . . P[LBIA[B−1]] (create a "local fingerprint" of P)

create the set SPRM from all LTI[i] such that i-th row of LTT matches the local fingerprint.

In other words, function CurCage[j].func(P) can be defined as "local fingerprint of P (defined by bits from positions CurCage.LBIA) matches CurCage.LTT[j]", and value CurCage[j].ind is CurCage.LTI[j].

As an example, let L=64 (two 32-bit prefix fields), B=3, NW=5, and NW'=3. Suppose the following group of 5 rules are in the table TR with NTR=256 entries:

TR[109]=
00110100111001010011 0xxxxxxxxxxx_1001011101000-010000001111010xxxx
TR[167]=
00110100111001011xxxxxxxxxxxxxxx_1001011101000-0100000011110111100
TR[211]=
00110100111001011xxxxxxxxxxxxxxx_1001011101000-0100000011110xxxxxx
TR[230]
00110100111001 1xxxxxxxxxxxxxxxxx_10010111010000-1000000111100xxxxx
TR[234]=
0011010xxxxxxxxxxxxxxxxxxxxxxxxx_100101110100-00100000011110111100

Let LBIA contain values 49, 47, and 5 (the bits at these positions are highlighted in bold). Extracting these bits, the following table LTT with 5 rows and 3 columns (rules' addresses are included for reference) is obtained:

001 (rule #109)
011 (rule #167)
01x (rule #211)
1x0 (rule #230)
xx1 (rule #234)

Thus, the cage has the following structure:
LBIA is array of three six-bit integers (49, 47, 5);
LTT is a 0/1/x array with 5 strings of 3 symbols each: ("001", "011", "01x", "1x0", "xx1");
LTI is an array of five eight-bit integers (109, 167, 211, 230, 234)

When an input packet P (e.g., P=00110100 11100101101101100100010_1001011101000010000011-110111101) is processed by the cage, the following is performed:

create a local fingerprint according to LBIA, i.e., extract bits from positions 49, 47, 5 (highlighted in bold): they are 0, 1, and 1 respectively;
test matching of the bit string 011 with each of the five symbol strings "001", "011", "01x", "1x0", "xx1" (from LTT). The answers are no, yes, yes, no, and yes respectively;
create SPRM from the elements of LTI which correspond to "yes" answers; these are (167, 211, 234). While there is no guarantee that rules with these numbers match the packet (rules #167 and #234 do not because there is a mismatch in the rightmost bit), it is guaranteed that no matching rule is omitted from placement in the SPRM.

In the worst case, SPRM is generated with NW elements. Processing of the functions to reduce the size of this set to values smaller than NW (in average or worst case) is done during database compilation. This processing may include associating rules with a cage and accurately identifying positions of fingerprint bits.

Figure 16:
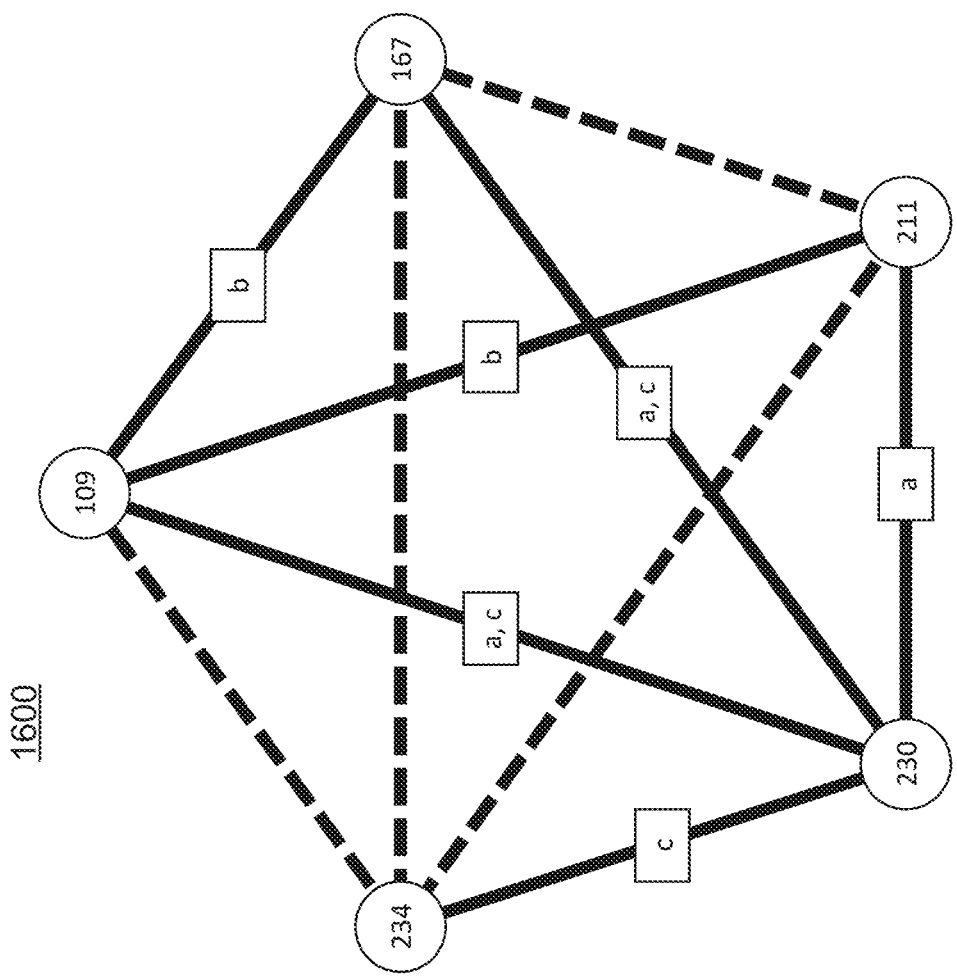
FIG. 16 illustrates an example diagram illustrating pairs of rules that may simultaneously match the same packet in accordance with certain embodiments.

The functions should also be created such that the limit of NW' (a number which is less than the cage's size NW) is satisfied (otherwise a runtime failure may result). If two rules have opposite symbols (i.e., "0" and "1") in the same columns, they cannot match the same packet. FIG. 16 depicts the relationships between the rules from the example above. Circles represent rules; dashed edges connect pair of rules which can match the same packet; solid lines connect pairs of rules which never match the same packet (labels "a", "b", "c" denote distinction in the leftmost, middle and the rightmost bits, respectively; multiple labels like "a, c" for the same edge show distinctions in multiple bits). It can be seen that rules 167, 211, and 234 cannot be distinguished: there are no solid lines connecting them; but among any four rules there is at least one solid line. Therefore, these five rules can be combined in one cage when NW'=3 (or 4, 5, etc.), but not when NW'=2 or 1—at least for the choice of fingerprint bits which was made above. Different choice of these bits may generally lead to different limits for NW'; but in this example, achieving a better limit is impossible, because any packet matching rule #167 matches rules #211 and #234 as well.

Figure 17:
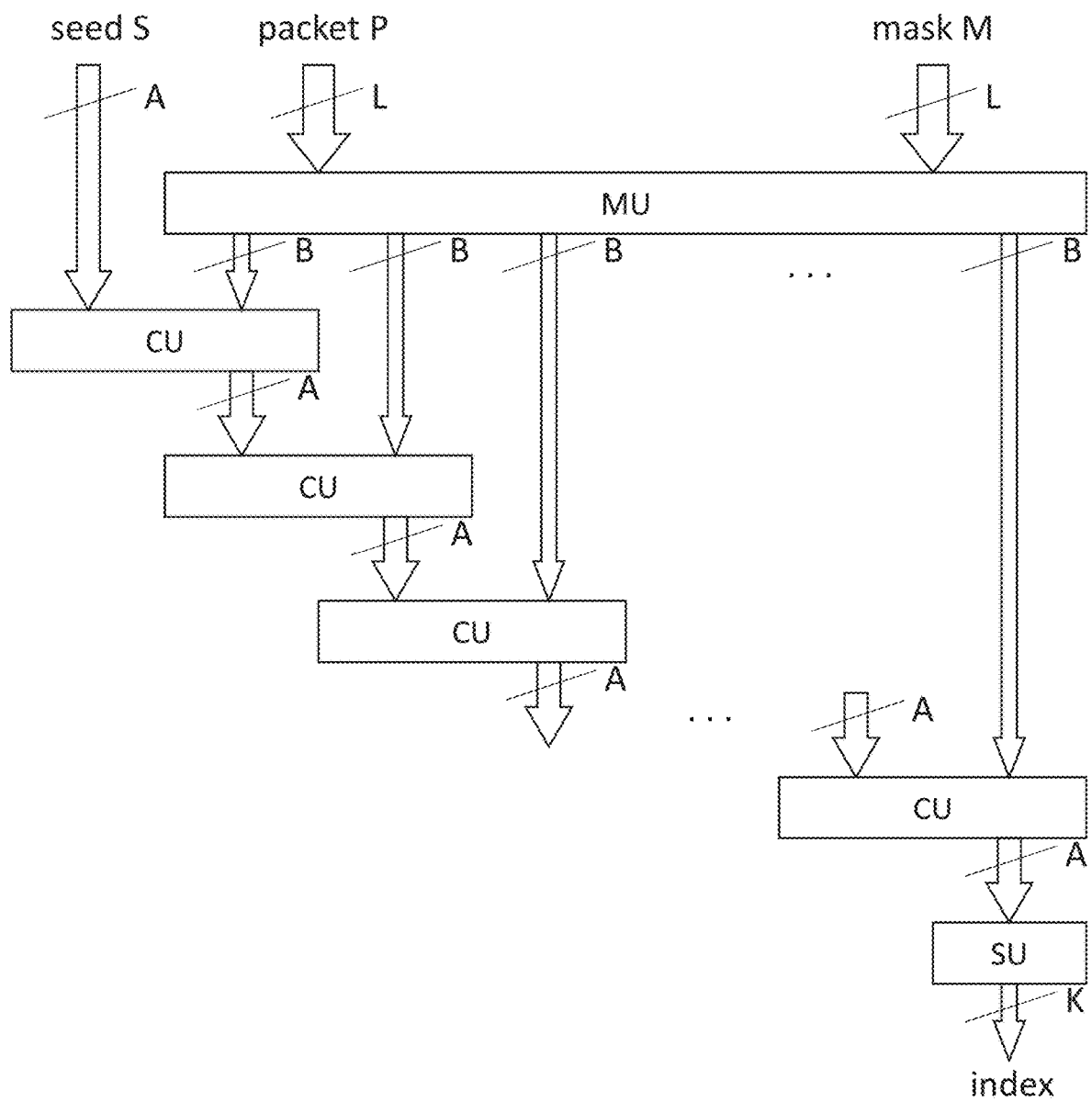
FIG. 17 illustrates a block diagram of a mask-based index function using a chain of levels in accordance with certain embodiments.

FIG. 17 illustrates a block diagram of a mask-based index function 1700 using a chain of levels in accordance with certain embodiments. In the embodiments herein, any suitable indexing functions may be used, however the indexing functions preferably have the following properties: (i) a given range of output values (to match the address space of the table to be indexed), (ii) the same output value for all packets matching the same rule, and (iii) different output values for packets matching different rules (this is a desired property but is not required).

Mask-based indexing functions may include each of these properties. The central object of a mask-based indexing function is a mask, which is a sequence of zeros and ones that is the same length as the format of a rule database. In one embodiment, a rule R fits the mask M (or in other words a mask M fits the rule R), if all packets that match the rule R produce the same result when ANDed (in a bitwise sense) with the mask M. In a more constructive form, "a rule fits a mask" means that:

For bit fields: in the positions of any "x" symbol of the rule, mask must have bit 0; in the positions of symbols "0" or "1", the mask may contain any bit value;
For numerical fields: consider binary notation of all possible integers between the lower bound and the upper bound (including both bounds); then for any bit position where the numbers do not all contain the same binary digit, the mask must have bit 0; for the positions where all the numbers have the same binary digit, the mask may contain any bit value.

As an example, the rule {"11010xxx", "011xxxxx", 13:43, 10:10, "x0x1"} fits the mask 01110000_11000000_000000_111100_0001 (underscores added for readability purposes), but doesn't fit any of the following masks (violating bits marked in bold):

01111101_11000000_000000_111100_0001
01110000_11000000_100000_111100_0001
01110000_11000000_000000_111100_0011

A class of mask-based index functions may be defined as follows. Let $F_M(P)$ be an (L, K)-index function based on mask M, if it can be represented in a form f(P & M), where "&" is a bitwise AND operation between L-bit packet P and L-bit mask M, and f is a function with L-bit input and K-bit output (the output values will be interpreted as numbers from the range $0 \ldots 2^K-1$). With this definition, properties (i) and (ii) are satisfied, and desired property (iii) can be transformed into a statement of the form "sequence M should have as many 1s as possible and function f must be a good enough signature/hash", that is, f should produce as few as possible collisions.

Any suitable techniques may be used to identify the index functions. For example, if there are several possible masks such that all desired rules fit each of them, then the mask with the maximum number of is may be selected. As another example, a chain or tree of compression units may be used within the function. FIG. 16 illustrates a chain of compression units CU and FIG. 17 illustrates a tree of compression units.

Index function 1700 includes a masking unit (MU) that performs a bitwise AND between packet P and mask M. The output of the masking unit is split into various segments of B bits. Index function 1700 includes a compression unit chain of n levels, where n=LB (rounded up). In particular embodiments, if L<nB, the masking unit may also provide padding by adding any suitable combinations of ones and zeros to the output of the masking unit such L+number of padded bits=nB.

Index function 1700 also includes compression units CU that each compute a simple hash on B bits from the masking unit plus the A bit output from the previous level (or a seed value if the compression unit is at the first level) to output a value of A bits. In particular embodiments, the values of the width A of internal busses in the index functions may be about $2*\log_2$(number of rules). Width B can be equal to A or different (B's value does not generally determine the quality of hashing, but it directly influences the complexity and delay of the entire computation). CUs within the same index function may be unique or identical with respect to one another. Any suitable combination of various CUs may be used by an index function. In various embodiments, the CUs are chosen such that the hashes may be easily computed in software and have low depth implementation in hardware. Any suitable hashes may be performed, such as linear or multiplicative hashing algorithms. Ideally, hashes which can be easily computed and have low depth implementation in hardware are used.

Index function 1700 also includes a shrinking unit (SU) that shrinks an A-bit result from the last CU down to the desired number of bits K by truncating one or more of the A bits (e.g., the most significant bits or the least significant bits) or by using a compression algorithm to generate K bits based on the A bits.

Figure 18:
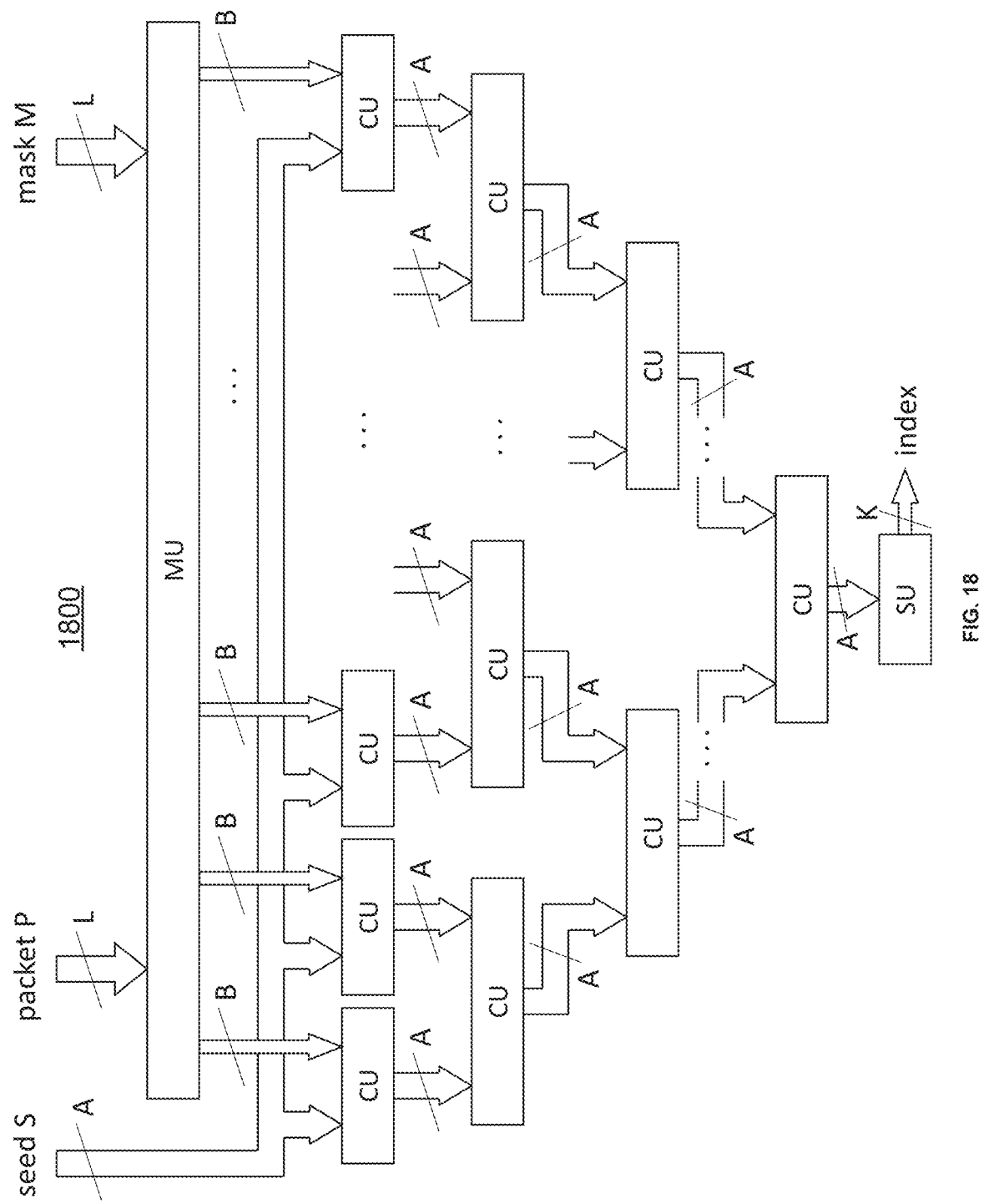
FIG. 18 illustrates a block diagram of a mask-based index function using a binary tree in accordance with certain embodiments.

FIG. 18 illustrates a block diagram of a mask-based index function 1800 using a binary tree in accordance with certain embodiments. Index function 1800 includes a masking unit (MU) that performs a bitwise AND between packet P and mask M. The output of the masking unit is split into various segments of B bits. Index function 1800 includes a binary tree having n leaves (i.e., n compression units at the top level). In particular embodiments, if L<nB, the masking unit may also provide padding by adding any suitable combinations of ones and zeros to the output of the masking unit such L+number of padded bits=nB.

Index function 1800 also includes a first level of compression units CU that each compute a simple hash on B bits from the masking unit plus a seed value having A bits. Each compression unit outputs a hashed value of A bits. The output of two compression units is the input to a compression unit at the next level of the tree. The output of the last compression unit is fed to a shrinking unit SU that shrinks the A-bit result down to the desired number of bits K by truncating one or more of the A bits (e.g., the most significant bits or the least significant bits) or by using a compression algorithm to generate K bits based on the A bits.

Figure 19:
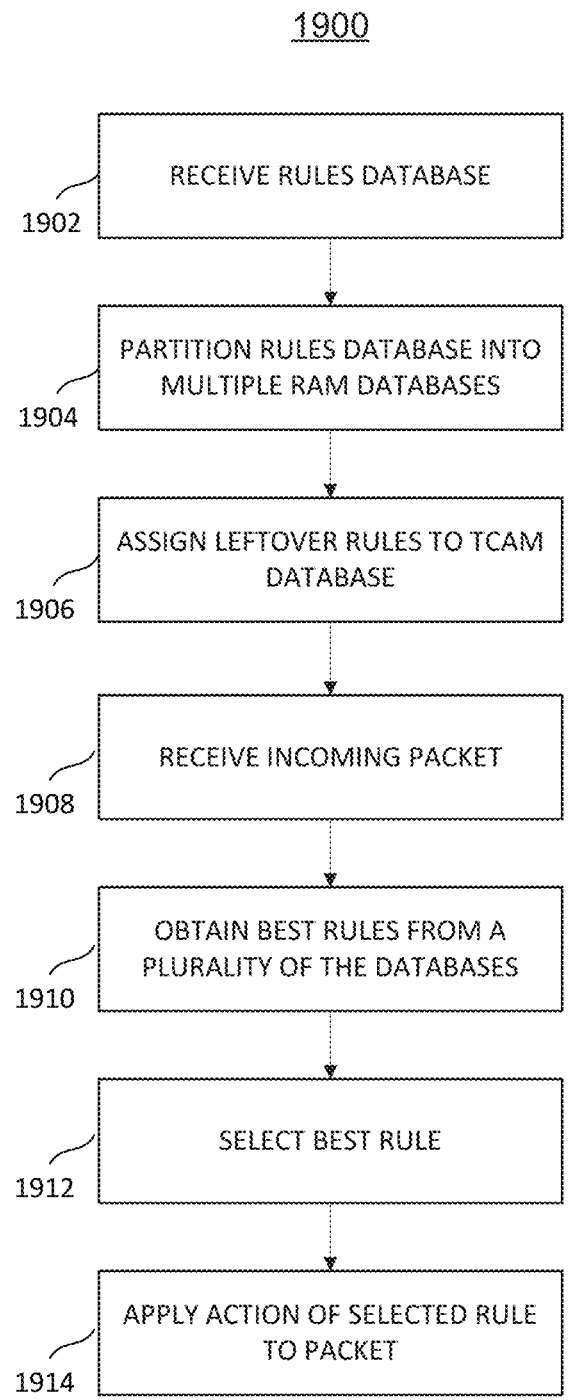
FIG. 19 illustrates an example method for classifying a packet in accordance with certain embodiments.

FIG. 19 illustrates an example method for classifying a packet in accordance with certain embodiments. The steps of the method may be performed by a network device 104 alone or in combination with one or more other devices or logic. At step 1902, a rules database is received. In one example, a network administrator or other user associated with network device may send rules (or other criteria from which rules may be generated) to network device 104. The rules database may include any suitable number of rules. At step 1904, the rules database is partitioned into multiple rules databases and each of these smaller rules databases may be stored, e.g., in RAM. The partitioning of the rules to these smaller rules databases may be based on any suitable factors, such as the number or size of particular memory modules that will store the rules databases, the determination of indexing functions that will be used to select the rules based on incoming packets, expected performance associated with the rules databases, or other suitable factors.

In various embodiments, one or more indexing functions for a rules database (i.e., table TR) are selected so as to maximize the number of rules that may be placed in the rules database (i.e., maximize the number of rules that may be distinguished using the indexing function(s) corresponding to that rules database). In some embodiments, the first rules database may include 50-90% of the rules received at step 1902, with each successive rules database including a smaller amount of the rules. Successive indexing functions and rules databases may be generated until one or more conditions are met. For example, the partitioning of the rules into various databases may stop when a maximum number of indexing functions or rule tables have been generated, when the RAM designated for rule storage is used up, when a targeted number of remaining rules is reached, when the number of remaining rules would fit in one or more designated CAMs, or other suitable conditions are met.

At step 1906, any rules that are not placed into one of the rules databases (e.g., in RAM), are placed into a CAM (or similar memory), such as a TCAM. For example, rules that cannot be efficiently processed using RAM and comparing logic are placed into the TCAM. In various embodiments, after the rules are partitioned into between two and four databases in RAM, only a small portion (e.g., 1%-2%) remain and are placed into the CAM memory.

At step 1908, an incoming data packet is received. At step 1910, the best rules are obtained from a plurality of the rule databases. A search may be performed on each rules database using the packet as input. For each of the databases stored in RAM, one or more indexing functions may be used to identify candidate rules from the database which may then be filtered based on whether they match the packet and their respective priorities. For the database stored in CAM, a CAM based method is used to identify the best rule (if at least one matching rule exists). The best rules from the various databases are then analyzed to select the best rule at step 1912. At step 1914, the action specified by the best rule is applied to the data packet. The network device 104 may perform the action or may instruct a different device to perform the action.

Some of the steps illustrated in FIG. 19 may be repeated, combined, modified or deleted where appropriate, and additional steps may also be added to the flowchart. Additionally, steps may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; content addressable memory (CAM), magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In one embodiment, a system comprises logic to receive a data packet; identify, based on the data packet, a plurality of candidate rules, the candidate rules comprising a first candidate rule from a first database of rules and a second candidate rule from a second database of rules; and select a rule from among the plurality of candidate rules based on a priority associated with the rule and a determination that the rule matches the data packet, the rule specifying at least one action to be performed on the data packet.

The system may further comprising a first random access memory comprising the first database of rules and a second random access memory comprising the second database of rules. The system may further comprise a content addressable memory to store a third database of rules and wherein the plurality of candidate rules comprises a third rule identified from the third database of rules. The logic is further to calculate an index based on the data packet; and identify the first candidate rule from the first database of rules based on the index. Calculating the index based on the data packet may comprise applying a bitwise mask to the data packet. Calculating the index based on the data packet may comprise calculating a hash value based on the data packet. Calculating the index based on the data packet may comprise truncating a result obtained by calculating a series of hash values based on the data packet. The logic may access a table of indices based on the calculated index to obtain one or more second indices; and access the first database of rules based on the one or more second indices to identify at least one candidate rule of the plurality of candidate rules. The plurality of candidate rules may comprise a plurality of rules selected from the first database of rules based on distinct indexes computed based on the data packet. The logic may distribute a majority of a plurality of rules among a plurality of databases of rules stored in random access memories and assign the remaining rules of the plurality of rules to a content addressable memory. The logic may perform, on the data packet, the action specified by the selected rule. The logic may determine that at least one of the rules of the first database of rules does not match the packet based on a comparison of one or more bits of the rule with one or more bits of the data packet.

In one embodiment, a method comprises receiving a data packet; identifying, based on the data packet, a plurality of candidate rules, the candidate rules comprising a first candidate rule from a first database of rules and a second candidate rule from a second database of rules; and selecting a rule from among the plurality of candidate rules based on a priority associated with the rule and a determination that the rule matches the data packet, the rule specifying at least one action to be performed on the data packet.

The method may further comprise calculating an index based on the data packet; and identifying the first candidate rule from the first database of rules based on the index. The method may further comprise accessing a table of indices based on the calculated index to obtain one or more second indices; and accessing the first database of rules based on the one or more second indices to identify at least one candidate rule of the plurality of candidate rules. Calculating the index based on the data packet may comprise applying a bitwise mask to the data packet. Calculating the index based on the data packet may comprise calculating a hash value based on the data packet. Calculating the index based on the data packet may comprise truncating a result obtained by calculating a series of hash values based on the data packet. The method may further comprise distributing a majority of a plurality of rules among a plurality of databases of rules to be stored in random access memories and assigning the remaining rules of the plurality of rules to a content addressable memory. The method may further comprise performing, on the data packet, the at least one action specified by the rule. The plurality of candidate rules may comprise a plurality of rules selected from the first database of rules based on distinct indexes computed based on the data packet. The method may further comprise determining that at least one of the rules of the first database of rules does not match the packet based on a comparison of one or more bits of the rule with one or more bits of the data packet. The method may further comprise storing the first database of rules in a first random access memory and storing the second database of rules in a second random access memory. The method may further comprise storing a third database of rules in a content addressable memory. The plurality of candidate rules may comprise a third rule identified from the third database of rules.

An apparatus comprising means for receiving a data packet; means for identifying, based on the data packet, a plurality of candidate rules, the candidate rules comprising a first candidate rule from a first database of rules and a second candidate rule from a second database of rules; and means for selecting a rule from among the plurality of candidate rules based on a priority associated with the rule and a determination that the rule matches the data packet, the rule specifying at least one action to be performed on the data packet.

The apparatus may further comprise means for calculating an index based on the data packet; and means for identifying the first candidate rule from the first database of rules based on the index. The apparatus may further comprise means for accessing a table of indices based on the calculated index to obtain one or more second indices; and means for accessing the first database of rules based on the one or more second indices to identify at least one candidate rule of the plurality of candidate rules. Calculating the index based on the data packet may comprise applying a bitwise mask to the data packet. Calculating the index based on the data packet may comprise calculating a hash value based on the data packet. Calculating the index based on the data packet may comprise truncating a result obtained by calculating a series of hash values based on the data packet. The apparatus may further comprise means for distributing a majority of a plurality of rules among a plurality of databases of rules to be stored in random access memories and assigning the remaining rules of the plurality of rules to a content addressable memory. The apparatus may further comprise means for performing, on the data packet, the at least one action specified by the rule. The plurality of candidate rules may comprise a plurality of rules selected from the first database of rules based on distinct indexes computed based on the data packet. The apparatus may further comprise means for determining that at least one of the rules of the first database of rules does not match the packet based on a comparison of one or more bits of the rule with one or more bits of the data packet. The apparatus may further comprise means for storing the first database of rules in a first random access memory and storing the second database of rules in a second random access memory. The apparatus may further comprise means for storing a third database of rules in a content addressable memory, and wherein the plurality of candidate rules comprises a third rule identified from the third database of rules.

In one embodiment, at least one machine readable storage medium has instructions stored thereon, the instructions when executed by a machine to cause the machine to receive a data packet; identify, based on the data packet, a plurality of candidate rules, the candidate rules comprising a first candidate rule from a first database of rules and a second candidate rule from a second database of rules; and select a rule from among the plurality of candidate rules based on a priority associated with the rule and a determination that the rule matches the data packet, the rule specifying at least one action to be performed on the data packet.

The instructions when executed by the machine may further cause the machine to calculate an index based on the data packet; and identify the first candidate rule from the first database of rules based on the index. The instructions when executed by the machine may further cause the machine to access a table of indices based on the calculated index to obtain one or more second indices; and access the first database of rules based on the one or more second indices to identify at least one candidate rule of the plurality of candidate rules. Calculating the index based on the data packet may comprise applying a bitwise mask to the data packet. Calculating the index based on the data packet may comprise calculating a hash value based on the data packet. Calculating the index based on the data packet may comprise truncating a result obtained by calculating a series of hash values based on the data packet. The instructions when executed by the machine may further cause the machine to distribute a majority of a plurality of rules among a plurality of databases of rules to be stored in random access memories and assign the remaining rules of the plurality of rules to a content addressable memory. The instructions when executed by the machine may further cause the machine to perform, on the data packet, the at least one action specified by the rule. The plurality of candidate rules may comprise a plurality of rules selected from the first database of rules based on distinct indexes computed based on the data packet. The instructions when executed by the machine may further cause the machine to determine that at least one of the rules of the first database of rules does not match the packet based on a comparison of one or more bits of the rule with one or more bits of the data packet. The instructions when executed by the machine may further cause the machine to store the first database of rules in a first random access memory and store the second database of rules in a second random access memory. The instructions when executed by the machine may further cause the machine to store a third database of rules in a content addressable memory, and wherein the plurality of candidate rules comprises a third rule identified from the third database of rules.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system comprising:
    logic comprising at least one logic gate, the logic to:
        receive a data packet;
        perform a parallel mask-based indexing function on the data packet against a rules database comprising a plurality of rules tables, wherein the mask-based indexing function yields zero or more candidate rules per rules table, wherein a rule is to be designated as not a candidate rule if it is guaranteed to not match the data packet, wherein a rule designated as a candidate rule is not guaranteed to match the data packet, and wherein the logic is to search the rules database substantially in parallel;
        identify a set of matching rules from among the candidate rules; and
        select a selected rule from among the set of matching rules based on a priority associated with the selected rule, the selected rule specifying at least one action to be performed on the data packet.

2. The system of claim 1, further comprising a first random access memory comprising a first rules table of the rules database and a second random access memory comprising a second rules table of the rules database.

3. The system of claim 2, further comprising a content addressable memory to store a third rules table of the rules database, and wherein the candidate rules comprise a rule identified from the third rules table of the rules database.

4. The system of claim 1, wherein the logic is further to:
    calculate an index based on the data packet; and
    identify a first candidate rule from a first rules table of the rules database based on the calculated index.

5. The system of claim 4, wherein calculating the index based on the data packet comprises applying a bitwise mask to the data packet.

6. The system of claim 4, wherein calculating the index based on the data packet comprises calculating a hash value based on the data packet.

7. The system of claim 4, wherein the logic is further to:
access a table of indices based on the calculated index to obtain one or more second indices; and
access the first rules table of the rules database based on the one or more second indices to identify at least one candidate rule from among the candidate rules.

8. The system of claim 4, wherein the logic is further to:
access a table of cages based on the calculated index, wherein a cage comprises an array of elements, an element comprising an index to a rule and a preliminary function that indicates whether it is possible for the rule to match the data packet; and
wherein the first candidate rule is identified based on a determination that a preliminary function of a cage indicates that it is possible for the first candidate rule to match the data packet.

9. The system of claim 4, wherein the logic is further to calculate the index using a mask based index function comprising:
a masking unit that performs a bitwise AND operation between the data packet and a mask; and
a plurality of compression units, a compression unit to compute a hash based at least in part on a portion of an output of the masking unit.

10. The system of claim 7, wherein the table of indices comprises a plurality of entries, an entry of the plurality of entries corresponds to an index that may be calculated based on the data packet, and at least one entry of the plurality of entries comprises a plurality of second indices.

11. The system of claim 4, wherein the candidate rules comprise a plurality of rules selected from the first rules table of the rules database based on distinct indices computed based on the data packet.

12. The system of claim 1, wherein the logic is further to distribute a majority of a plurality of rules among a plurality of databases of rules stored in random access memories and to assign the remaining rules of the plurality of rules to a content addressable memory.

13. The system of claim 1, wherein the logic is further to perform, on the data packet, the at least one action specified by the selected rule.

14. A method comprising:
receiving a data packet;
performing a parallel mask-based indexing function on the data packet against a rules database comprising a plurality of rules tables, wherein the mask-based indexing function yields zero or more candidate rules per rules table, wherein a rule is to be designated as not a candidate rule if it is guaranteed to not match the data packet, wherein a rule designated as a candidate rule is not guaranteed to match the data packet, and wherein the rules database is to be searched substantially in parallel;
identifying a set of matching rules from among the candidate rules; and
selecting a selected rule from among the set of matching rules based on a priority associated with the selected rule, the selected rule specifying at least one action to be performed on the data packet.

15. The method of claim 14, further comprising:
calculating an index based on the data packet; and
identifying a first candidate rule from a first rules table of the rules database based on the calculated index.

16. The method of claim 15, further comprising:
accessing a table of indices based on the calculated index to obtain one or more second indices; and
accessing the first rules table of the rules database based on the one or more second indices to identify at least one candidate rule from among the candidate rules.

17. The method of claim 14, further comprising distributing a majority of a plurality of rules among a plurality of databases of rules to be stored in random access memories and assigning the remaining rules of the plurality of rules to a content addressable memory.

18. At least one non-transitory machine readable storage medium having instructions stored thereon, the instructions when executed by a machine to cause the machine to:
receive a data packet;
perform a parallel mask-based indexing function on the data packet against a rules database comprising a plurality of rules tables, wherein the mask-based indexing function yields zero or more candidate rules per rules table, wherein a rule is to be designated as not a candidate rule if it is guaranteed to not match the data packet, wherein a rule designated as a candidate rule is not guaranteed to match the data packet, and wherein the the rules database is to be searched substantially in parallel;
identify a set of matching rules from among the candidate rules;
select a selected rule from among the set of matching rules based on a priority associated with the selected rule, the selected rule specifying at least one action to be performed on the data packet.

19. The at least one non-transitory machine readable storage medium of claim 18, the instructions when executed by the machine to further cause the machine to:
calculate an index based on the data packet; and
identify a first candidate rule from a first rules table of the rules database based on the index.

20. The at least one non-transitory machine readable storage medium of claim 19, the instructions when executed by the machine to further cause the machine to:
access a table of indices based on the calculated index to obtain one or more second indices; and
access the first rules table of the rules database based on the one or more second indices to identify at least one candidate rule from among the candidate rules.

21. The at least one non-transitory machine readable storage medium of claim 18, the instructions when executed by the machine to further cause the machine to distribute a majority of a plurality of rules among a plurality of databases of rules to be stored in random access memories and to assign the remaining rules of the plurality of rules to a content addressable memory.

22. An apparatus comprising:
means for performing a parallel mask-based indexing function on a data packet against a rules database comprising a plurality of rules tables, wherein the mask-based indexing function yields zero or more candidate rules per rules table, wherein a rule is to be designated as not a candidate rule if it is guaranteed to not match the data packet, wherein a rule designated as a candidate rule is not guaranteed to match the data packet, and wherein the rules database is to be searched substantially in parallel;
means for identifying a set of matching rules from among the candidate rules; and
means for selecting a rule from among the set of matching rules based on a priority associated with the selected rule, the selected rule specifying at least one action to be performed on the data packet.

23. The apparatus of claim 22, further comprising:
means for calculating an index based on the data packet; and
means for identifying a first candidate rule from a first rules table of the rules database based on the calculated index.

24. The apparatus of claim 23, further comprising:
means for accessing a table of indices based on the calculated index to obtain one or more second indices; and
means for accessing the first rules table of the rules database based on the one or more second indices to identify at least one candidate rule from among the candidate rules.

25. The apparatus of claim 22, further comprising means for distributing a majority of a plurality of rules among a plurality of databases of rules to be stored in random access memories and for assigning the remaining rules of the plurality of rules to a content addressable memory.

* * * * *

UNITED STATES PATENT AND TRADEMARK OFFICE
CERTIFICATE OF CORRECTION

| | |
|---|---|
| PATENT NO. | : 11,418,632 B2 |
| APPLICATION NO. | : 14/969834 |
| DATED | : August 16, 2022 |
| INVENTOR(S) | : Anatoli A. Bolotov and Mikhail I. Grinchuk |

Page 1 of 1

It is certified that error appears in the above-identified patent and that said Letters Patent is hereby corrected as shown below:

In the Claims

Column 32 Lines 21-23 Claim 18 change:
"and wherein the the rules database is to be searched substantially in parallel;"
To:
and wherein the rules database is to be searched substantially in parallel;

Signed and Sealed this
Thirty-first Day of January, 2023

*Katherine Kelly Vidal*

Katherine Kelly Vidal
*Director of the United States Patent and Trademark Office*